(12) United States Patent
Imafuji et al.

(10) Patent No.: US 9,036,076 B2
(45) Date of Patent: May 19, 2015

(54) INTERCHANGEABLE LENS, CAMERA BODY AND CAMERA SYSTEM FOR TRANSMITTING DRIVE CONDITION INFORMATION AT DIFFERENT FREQUENCIES

(75) Inventors: Kazuharu Imafuji, Kawasaki (JP); Masafumi Oikawa, Mitaka (JP)

(73) Assignee: NIKON CORPORATION, Tokyo (JP)

( * ) Notice: Subject to any disclaimer, the term of this patent is extended or adjusted under 35 U.S.C. 154(b) by 516 days.

(21) Appl. No.: 13/172,254

(22) Filed: Jun. 29, 2011

(65) Prior Publication Data

US 2011/0317061 A1 Dec. 29, 2011

(30) Foreign Application Priority Data

Jun. 29, 2010 (JP) ................................. 2010-147813
Sep. 9, 2010 (JP) ................................. 2010-202103

(51) Int. Cl.
*G03B 17/14* (2006.01)
*H04N 5/232* (2006.01)
*G03B 19/12* (2006.01)

(52) U.S. Cl.
CPC ............ *G03B 17/14* (2013.01); *H04N 5/23209* (2013.01); *G03B 19/12* (2013.01)

(58) Field of Classification Search
None
See application file for complete search history.

(56) References Cited

U.S. PATENT DOCUMENTS

| 5,003,399 | A | * | 3/1991 | Ishimaru et al. | 348/361 |
| 5,387,960 | A | * | 2/1995 | Hirasawa et al. | 396/135 |
| 6,088,533 | A | | 7/2000 | Shiomi | |
| 6,320,613 | B1 | | 11/2001 | Shiomi | |
| 2002/0047912 | A1 | * | 4/2002 | Mabuchi et al. | 348/345 |
| 2009/0285572 | A1 | * | 11/2009 | Shibuno et al. | 396/133 |
| 2011/0063472 | A1 | * | 3/2011 | Kitahira et al. | 348/222.1 |
| 2011/0080488 | A1 | | 4/2011 | Okamoto et al. | |
| 2011/0229118 | A1 | * | 9/2011 | Imafuji | 396/529 |
| 2012/0066539 | A1 | * | 3/2012 | Oikawa | 713/600 |

FOREIGN PATENT DOCUMENTS

| CN | 101295122 A | 10/2008 |
| JP | A-3-247179 | 11/1991 |
| JP | A-4-69627 | 3/1992 |
| JP | A-7-191354 | 7/1995 |
| JP | A-8-6086 | 1/1996 |

(Continued)

OTHER PUBLICATIONS

Apr. 24, 2012 Office Action issued in Japanese Application No. 2010-147813 (with translation).

(Continued)

*Primary Examiner* — Dennis Hogue
(74) *Attorney, Agent, or Firm* — Oliff PLC

(57) ABSTRACT

An interchangeable lens that is detachably mounted at a camera body includes: a photographic optical system that includes a first drive target member and a second drive target member, and a drive condition information transmission unit that transmits to the camera body first drive condition information to the drive condition of the first drive target member and second drive condition information to the drive condition of the second optical member. The drive condition information transmission unit transmits the first drive condition information with a first frequency and transmits the second drive condition information with a second frequency lower than the first frequency by attaching the second drive condition information to the first drive condition information.

16 Claims, 11 Drawing Sheets

(56) References Cited

FOREIGN PATENT DOCUMENTS

| | | |
|---|---|---|
| JP | A-10-68871 | 3/1998 |
| JP | A-10-197779 | 7/1998 |
| JP | A-11-125860 | 5/1999 |
| JP | A-2000-105402 | 4/2000 |
| JP | A-2002-244174 | 8/2002 |
| JP | A-2002-354490 | 12/2002 |
| JP | A-2003-35927 | 2/2003 |
| JP | A-2003-195383 | 7/2003 |
| JP | A-2003-202623 | 7/2003 |
| JP | A-2008-187385 | 8/2008 |
| JP | WO2009/139118 A1 | 11/2009 |
| JP | A-2010-26010 | 2/2010 |
| JP | A-2010-226666 | 10/2010 |
| JP | A-2010-237514 | 10/2010 |
| WO | WO 2009139186 A1 * 11/2009 ............ G03B 17/14 |  |

OTHER PUBLICATIONS

Jul. 17, 2012 Notification of Reason(s) for Refusal issued in Japanese Patent Application No. 2010-202103 (with translation).

Japanese Office Action issued in Japanese Patent Application No. 2010-147813 on Jan. 22, 2013 (with translation).

Jan. 30, 2015 Office Action issued in Chinese Application No. 201110187827.4.

* cited by examiner

FIG.8

| 23 | 16 15 | 8 7 | 0 |
|---|---|---|---|
| NUM | N/A | VR\|IR\|FL | 41H |

~ 80

INTERCHANGEABLE LENS, CAMERA BODY AND CAMERA SYSTEM FOR TRANSMITTING DRIVE CONDITION INFORMATION AT DIFFERENT FREQUENCIES

INCORPORATION BY REFERENCE

The disclosures of the following priority applications are herein Incorporated by reference: Japanese Patent Application No. 2010-147813 filed Jun. 29, 2010 and Japanese Patent Application No. 2010-202103 filed Sep. 9, 2010.

BACKGROUND OF THE INVENTION

1. Field of the Invention

The present invention relates to an interchangeable lens, a camera body and a camera system.

2. Description of Related Art

An interchangeable lens used in a camera system normally includes at least one optical member (drive target member or driven member) the drive condition (driven condition) of which changes, such as a focus adjustment lens, disposed within the interchangeable lens. Information (drive condition information or driven condition information) related to the drive condition (driven condition) of such an optical member (drive target member or driven member) is required to enable various types of control at the camera body. The camera system disclosed in Japanese Laid Open Patent Publication No. H10-68871, for instance, includes an encoder that monitors the motion of a lens transmission system. A monitor signal indicating a drive quantity, which is output by the encoder, is fed back to the lens drive control CPU via a lens-side contact point located at a mount unit via which the lens is mounted at the body and a body-side contact point corresponding to the lens-side contact point. In addition, on the other hand, the main CPU within the camera body is connected with the lens CPU and the like disposed in the photographic lens via a contact point other than the contact point via which the monitor signal is transmitted in the camera system described in Japanese Laid Open Patent Publication No, H10-68871. The main CPU receives information required for camera sequence control and exposure operation control from another CPU or the like and provides another CPU with camera sequence information needed at the other CPU. In other words, the contact point via which the main CPU and the lens CPU are connected enables universal communication. Information to be transmitted from the lens CPU through the universal communication contact point to the main CPU collected by the lens CPU first.

SUMMARY OF THE INVENTION

The lens CPU, which transmits drive condition information (driven condition information) over regular intervals via the universal communication contact point described above, needs to collect the drive condition information over regular intervals and therefore, the calculation load placed on the lens CPU is bound to be significant.

According to the 1st aspect of the present invention, an interchangeable lens that is detachably mounted at a camera body comprises: a photographic optical system that includes a first drive target member and a second drive target member, a drive condition of each of which changes; and a drive condition information transmission unit that transmits to the camera body first drive condition information pertaining to the drive condition of the first drive target member and second drive condition information pertaining to the drive condition of the second optical member. The drive condition information transmission unit transmits the first drive condition information with a first frequency and transmits the second drive condition information with a second frequency lower than the first frequency by attaching the second drive condition information to the first drive condition information.

According to the 2nd aspect of the present invention, in the interchangeable lens according to the 1st aspect, it is preferred that the interchangeable lens further comprises: a frequency information reception unit that receives from the camera body frequency information indicating a frequency lower than the first frequency. The drive condition information transmission unit transmits the second drive condition information by designating the frequency indicated in the frequency information as the second frequency.

According to the 3rd aspect of the present invention, in the interchangeable lens according to the 2nd aspect, it is preferred that the drive condition information transmission unit transmits the first drive condition information and the second drive condition information to the camera body via a first transmission path; and the frequency information reception unit receives the frequency information from the camera body via a second transmission path different from the first transmission path.

According to the 4th aspect of the present invention, in the interchangeable lens according to the 1st aspect, it is preferred that the interchangeable lens further comprises: an operation information reception unit that receives, from the camera body, body operation information pertaining to an operating state of the camera body. The drive condition information transmission unit alters the second frequency in correspondence to the body operation information having been received.

According to the 5th aspect of the present invention, in the interchangeable lens according to the 4th aspect, it is preferred that the first drive target member and the second drive target member are driven independently of each other; and the first drive condition information and the second drive condition information change independently of each other.

According to the 6th aspect of the present invention, in the interchangeable lens according to the 5th aspect, it is preferred that the drive condition information transmission unit transmits the first drive condition information and the second drive condition information to the camera body via a first transmission path; and the operation information reception unit receives the body operation information from the camera body via a second transmission path different from the first transmission path.

According to the 7th aspect of the present invention, in the interchangeable lens according to the 6th aspect, it is preferred that the body operation information is constituted with at least one of; information indicating whether or not the camera body is locked to a tripod, information indicating a photographing mode set at the camera body and information indicating remaining battery power available from a battery in the camera body.

According to the 8th aspect of the present invention, in the interchangeable lens according to the 4th aspect, it is preferred that the first drive target member and the second drive target member are each a focus lens used to adjust a focusing condition of the photographic optical system, a blur correction lens used to correct image blur manifested by the photographic optical system or an aperture via which an amount of light to be transmitted through the photographic optical system is adjusted.

According to the 9th aspect of the present invention, in the interchangeable lens according to the 7th aspect, it is preferred that the body operation information indicates whether or not the camera body is locked to the tripod; the second drive target member is a blur correction lens used to correct image blur manifested in the photographic optical system; and the drive condition information transmission unit adjusts the second frequency so as to lower the second frequency set when the body operation information indicates that the camera body is locked to the tripod relative to the second frequency set when the body operation information indicates that the camera body is not locked to the tripod.

According to the 10th aspect of the present invention, an interchangeable lens that is detachably mounted at a camera body comprises: a photographic optical system that includes a first drive target member and a second drive target member, a drive condition of each of which changes; a storage unit that stores first drive condition information pertaining to the drive condition of the first drive target member and second drive condition information pertaining to the drive condition of the second drive target member; a first drive condition information update unit that updates the first drive condition information stored in the storage unit with a first cycle; a second drive condition information update unit that updates the second drive condition information stored in the storage unit with a second cycle longer than the first cycle; and a drive condition information transmission unit that transmits to the camera body the first drive condition information and the second drive condition information stored in the storage unit.

According to the 11th aspect of the present invention, in the interchangeable lens according to the 10th aspect, it is preferred that the interchangeable lens further comprises: a cycle information reception unit that receives from the camera body cycle information indicating a cycle longer than the first cycle. The second drive condition information update unit updates the second drive condition information by designating the cycle indicated in the cycle information as the second cycle.

According to the 12th aspect of the present invention, in the interchangeable lens according to the 11th aspect, it is preferred that the interchangeable lens further comprises: a shortest cycle information transmission unit that transmits to the camera body shortest cycle information indicating a shortest cycle with which the second drive condition information update unit is able to update the second drive condition information.

According to the 13th aspect of the present invention, in the interchangeable lens according to the 11th aspect, it is preferred that the drive condition information transmission unit transmits the first drive condition information and the second drive condition information to the camera body via a first transmission path; and the cycle information reception unit receives the frequency cycle information from the camera body via a second transmission path different from the first transmission path.

According to the 14th aspect of the present invention, a camera body at which an interchangeable lens, equipped with a photographic optical system that includes a first drive target member and a second drive target member, a drive condition of each of which changes, is detachably mounted, comprises: a drive condition information reception unit that receives from the interchangeable lens first drive condition information pertaining to the drive condition of the first drive target member and second drive condition information pertaining to the drive condition of the second drive target member respectively with a first frequency and a second frequency; and a frequency information transmission unit that transmits to the interchangeable lens frequency information indicating a frequency equal to or lower than the first frequency. The drive condition information reception unit receives the second drive condition information with the frequency indicated in the frequency information designated as the second frequency.

According to the 15th aspect of the present invention, a camera system comprises: a camera body; and an interchangeable lens that can be detachably mounted at the camera body. The interchangeable lens includes: a photographic optical system that includes a first drive target member and a second drive target member, a drive condition of each of which changes; a storage unit that stores first drive condition information pertaining to the drive condition of the first drive target member and second drive condition information pertaining to the drive condition of the second drive target member; a first drive condition information update unit that updates the first drive condition information stored in the storage unit with a first cycle; a second drive condition information update unit that updates the second drive condition information stored in the storage unit with a second cycle longer than the first cycle; a shortest cycle information transmission unit that transmits to the camera body shortest cycle information indicating a shortest cycle with which the second drive condition information update unit is able to update the second drive condition information; a cycle information reception unit that receives from the camera body cycle information indicating a cycle longer than the first cycle; and a drive condition information transmission unit that transmits to the camera body the first drive condition information and the second drive condition information stored in the storage unit; the camera body includes: a shortest cycle information reception unit that receives the shortest cycle information; a cycle information transmission unit that transmits to the interchangeable lens the cycle information indicating a cycle that is not shorter than the cycle indicated in the shortest cycle information having been received at the shortest cycle information reception unit; and a drive condition information reception unit that receives from the interchangeable lens the first drive condition information and the second drive condition information, and the second drive condition information update unit updates the second drive condition information by designating the cycle indicated in the cycle information having been received at the cycle information reception unit as the second cycle.

BRIEF DESCRIPTION OF THE DRAWINGS

FIG. 8 shows the structure of cycle data (period data) transmitted by the body CPU 103.

DESCRIPTION OF PREFERRED EMBODIMENTS

Figure 1:
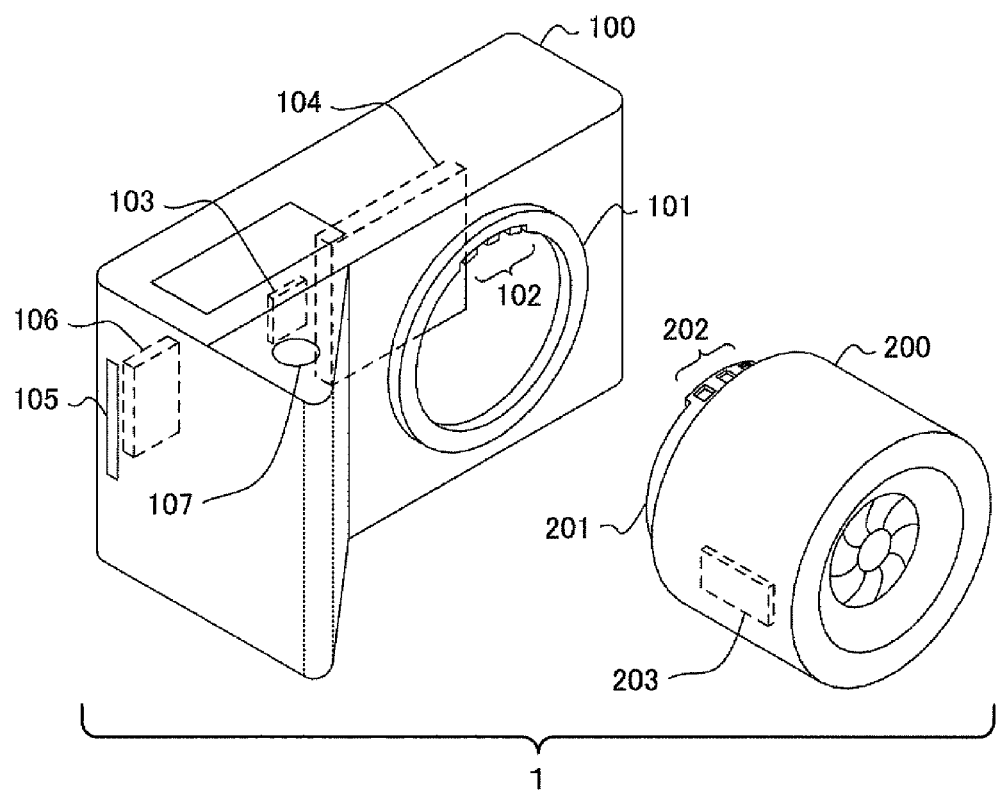
FIG. 1 is an external view of the camera system in conjunction with which the first through seventh embodiments (and their variations) of the present invention are adopted.

FIG. 1 is an external view of a camera system in conjunction with which the first through seventh embodiments (and their variations) of the present invention may be adopted. The camera system 1 comprises a camera body 100 and an interchangeable lens 200. The interchangeable lens 200 is detachably mounted at the camera body 100. The interchangeable lens 200 is mounted by fitting a lens-side lens mount 201 located at the interchangeable lens in a body-side lens mount 101 located at the camera body 100.

A plurality of contact points 102, via which data communication is conducted and power is supplied, are present at the body-side lens mount 101. A plurality of contact points 202, each corresponding to one of the plurality of contact points 102, are present on the lens-side lens mount 201. As the interchangeable lens 200 is mounted at the camera body 100, the contact points 102 and the contact points 202 become connected. As a result, power with which the interchangeable lens 200 operates is supplied from the camera body 100 to the interchangeable lens 200 and data communication, to be described later, between the camera body 100 and the interchangeable lens 200 is enabled.

A body CPU 103 is disposed at the camera body 100. The body CPU 103 controls the various units in the camera body 100 and executes initialization processing to be detailed later by executing a specific control program. It is desirable that the body CPU 103 executing the specific control program further execute body operation information transmission processing as well. A lens CPU 203 is disposed at the interchangeable lens 200. The lens CPU 203 controls the various units in the interchangeable lens 200 and executes initialization processing, drive condition information detection processing (driven condition information detection processing) and drive condition information transmission processing (driven condition information transmission processing), to be described later by executing a specific control program. It is desirable that the lens CPU 203 executing the specific control program further execute transmission frequency determination processing in order to determine the frequency with which the drive condition information (the driven condition information) is to be transmitted.

An image sensor 104 captures a subject image and outputs an imaging signals. In response to a depression of a shutter release switch 107 located at the camera body 100, the body CPU 103 executes various types of image processing on the imaging signals and creates image data. The image data thus created are stored into a portable storage medium 106 loaded in a storage medium insertion slot 105.

Figure 2:
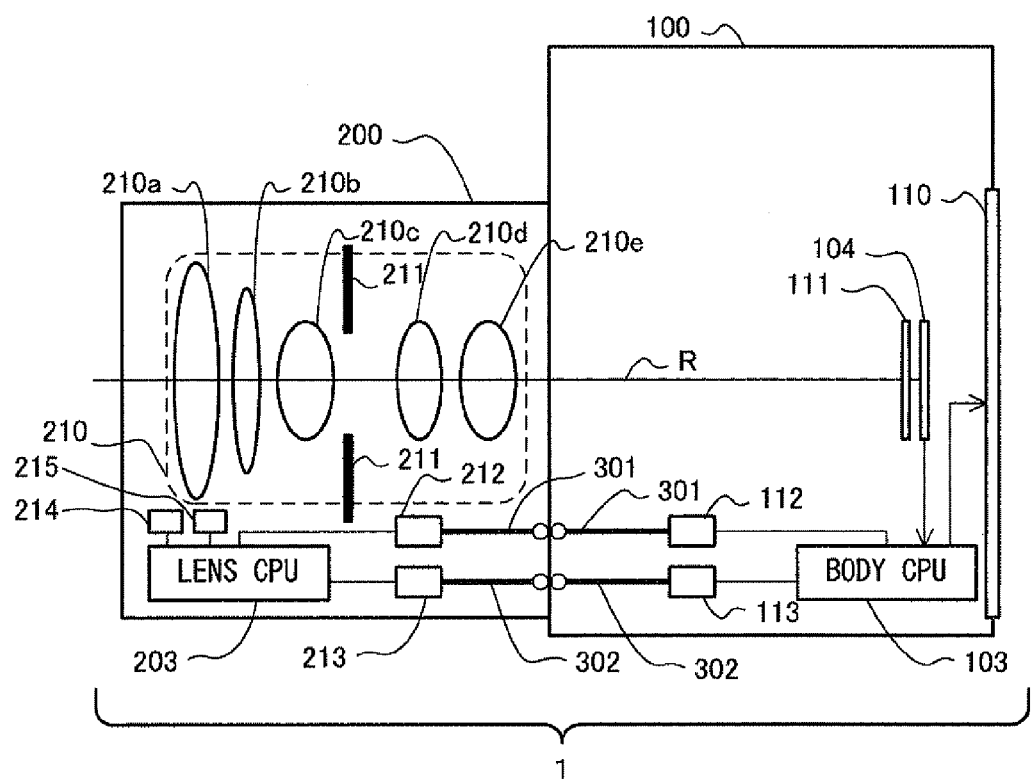
FIG. 2 is a sectional view of the structure assumed in the camera system 1 pertaining to the individual embodiments.

FIG. 2 is a sectional view of the structure assumed in the camera system 1 pertaining to the first through seventh embodiments (and their variations). The interchangeable lens 200 includes a built-in photographic optical system 210 constituted with a plurality of optical members. The optical members constituting the photographic optical system 210 are a plurality of lenses 210a through 210e and an iris diaphragm 211. The plurality of lenses include a focus lens 210c with which the focusing condition of the photographic optical system 210 is adjusted and a blur correction lens 210d used to correct an image blur occurring in the subject image.

It is to be noted that the optical members according to the present invention further include a member present on the photographic optical path that allows a light flux from the subject to pass through or blocks the subject light flux, in addition to the lenses 210a through 210e. For instance, the iris diaphragm 211, which adjusts the amount of subject light to pass through the photographic optical system 210, is one such optical member. In addition, an optical member among these optical members, the drive condition of which changes as it is driven, will be specifically referred to as a drive target member.

In the interchangeable lens 200, drive systems (not shown) each used to drive the focus lens 210e, the blur correction lens 210d or the iris diaphragm 211 are installed. The focus lens 210c may be driven by, for instance, an ultrasonic motor. In addition, the blur correction lens 210d may be driven with two voice coil motors, whereas the iris diaphragm 211 may be driven by a stepping motor. The lens CPU 203 alters the drive conditions of the individual optical members by controlling these drive systems. In other words, the focus lens 210c, the blur correction lens 210d and the iris diaphragm 211 are all drive target members in the embodiment.

A filter 111, achieved by combining an optical low pass filter and an infrared cut filter, is disposed to the front of the image sensor 104. Subject light having passed through the photographic optical system 210 in the interchangeable lens 200, centered on an optical axis R, enters the image sensor 104 via the filter 111. The body CPU 103 creates a display image based upon imaging signals output from the image sensor 104 and brings it up on display at an LCD module 110 disposed on the rear side of the camera body 100.

Two transmission paths extend between the body CPU 103 and the lens CPU 203, i.e., between the camera body 100 and the interchangeable lens 200, connecting the body CPU 103 and the lens CPU 103 via the contact points 102 and the contact points 202 shown in FIG. 1. Since these two transmission paths are independent of each other, data can be transmitted through one transmission path even while data transmission is in progress through the other transmission path. In the following description, the two transmission paths will be referred to as a first transmission path 301 and a second transmission path 302. In addition, the communication conducted through the first transmission path 301 will be referred to as hotline communication, whereas the communication conducted through the second transmission path 302 will be referred to as command data communication. Signal lines constituting the first transmission path 301 and the second transmission path 302 and specific details of the command data communication and the hotline communication will be described in further detail later.

In the camera body 100, a body-side first communication circuit 112 that enables the hotline communication and a body-side second communication circuit 113 that enables the command data communication are installed. These circuits are each connected to the body CPU 103. Likewise, a lens-side first communication circuit 212 that enables the hotline communication and a lens-side second communication circuit 213 that enables the command data communication are installed in the interchangeable lens 200. These circuits are each connected to the lens CPU 203.

The body-side first communication circuit 112 and the lens-side first communication circuit 212 are connected with each other through the first communication path 301. Likewise, the body-side second communication circuit 113 and the lens-side second communication circuit 213 are connected with each other through the second communication path 302.

In addition to these members, an autofocus adjustment device (not shown) enabling autofocus adjustment for the photographic optical system 210 is installed in the camera body 100. The autofocus adjustment device enables autofocus adjustment for the photographic optical system 210 by transmitting, via the body CPU 103, a drive instruction for the focus lens 210c to the lens CPU 203.

(Description of the Command Data Communication) The command data communication is a bidirectional communication conducted through the second transmission path 302. Data transmitted from the camera body 100 and data transmitted from the interchangeable lens 200 in the command data communication are synchronous with a single clock signal. This means that the data transmitted from the camera body 100 and the data transmitted from the interchangeable lens 200 are simultaneously transmitted through the second transmission path 302.

The command data communication is initiated by the body CPU 103. The body CPU 103 initiating a command data communication first transmits specific data constituting various instructions for the lens CPU 203. The lens CPU 203 interprets the data it has received so as to detect the specific instructions provided in the data. Subsequently, the lens CPU 203 executes processing corresponding to the instructions. For instance, upon receiving an instruction for constricting the iris diaphragm 211 to a specific size, the lens CPU 203 constricts the iris diaphragm 211 until the indicated size is achieved by controlling the stepping motor (not shown).

In addition, the lens CPU 203 having received an instruction requesting information related to the operating state of the lens CPU 203 transmits the requested information to the body CPU 103 through the second transmission path 302. Namely, the body CPU 103, needing to obtain information related to the interchangeable lens 200 through the command data communication, must first transmit to the interchangeable lens data expressing an instruction requesting the information.

Instructions that may be transmitted from the body CPU 103 through the command data communication also include an instruction for driving the focus lens 210c and an instruction indicating an on-off setting for image blur correction via the blur correction lens 210d in addition to the instructions described above.

(Description of the Hotline Communication) The hotline communication is a bidirectional communication conducted through the first transmission path 301. As is the command data communication, the hotline communication is initiated by the body CPU 103. As the body CPU 103 alters the signal level at a communication start signal line among the signal lines constituting the first transmission path 301, the lens CPU 203 detects the shift in the signal level. In response to the detected signal level shift, the lens CPU 203 sequentially executes drive condition information detection processing (to be described in detail later) and drive condition information transmission processing (to be described in detail later).

The body CPU 103 executes the hotline communication over a predetermined cycle (e.g., every millisecond). The hotline communication differs from the command data communication in that the body CPU 103 is able to receive data related to the interchangeable lens 200, provided by the lens CPU 203, with a light processing load through the hotline communication, since data transmission from the lens CPU 203 through the hotline communication can be started immediately simply by switching the signal level at a specific signal line, whereas data expressing an instruction for the lens CPU 203 must first be transmitted to the lens CPU 203 whenever data from the lens CPU 203 are to be received through the command data communication.

(Description of the Drive Condition Information) The interchangeable lens 200 in the embodiment includes optical members, the drive conditions of which change, i.e., the focus lens 210c, the blur correction lens 210d and the iris diaphragm 211 referred to as the drive target members. In the following description, information related to the drive conditions of these three optical members (drive target members) will be referred to as drive condition information. The drive condition information corresponding to the individual optical members (individual drive target members) is detected through drive condition information detection processing executed by the lens CPU 203 and is stored into a memory 214.

Figure 3A:
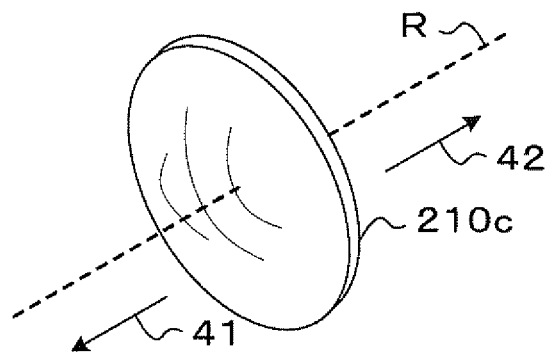
FIGS. 3A through 3C each illustrate drive condition information (driven condition information) pertaining to a specific optical member.
Figure 3B:
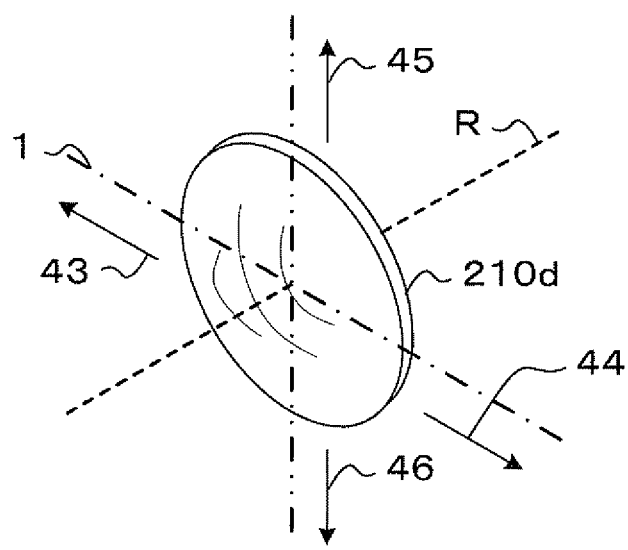
Figure 3C:
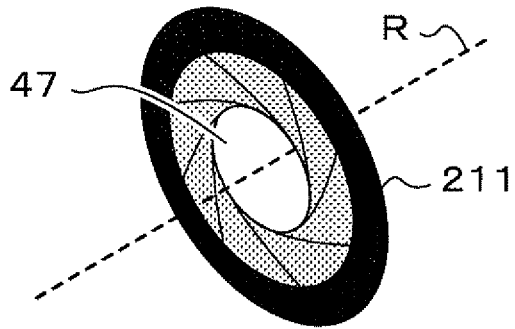

FIGS. 3A through 3C each indicate the drive condition information corresponding to a specific optical member. As shown in FIG. 3A, the focus lens 210c is driven along the optical axis R. The lens CPU 203 detects the drive quantity, i.e., the extent to which the focus lens 210c is driven, as the drive condition information. The drive quantity of the focus lens 210c is indicated by one-byte integral-value data. The range assumed for the integral value is −128 through +127. A positive value is assumed when the focus lens is driven along the direction indicated by an arrow 41 (toward the subject), whereas a negative value is assumed if the focus lens is driven along the direction indicated by an arrow 42 (toward the camera body 100. The drive quantity of the focus lens 210c is indicated by the integral value with a value of 0 set at the position assumed by the focus lens 210c through the most recent drive condition information detection processing. In other words, the integral value provided as the drive condition information for the focus lens 210c indicates the extent by which the focus lens has been displaced relative to the position assumed through the previous processing.

The drive quantity of the focus lens 210c is used for purposes of focus adjustment by the autofocus adjustment device. The autofocus adjustment device adjusts the focusing condition through a method of the known art based upon a change in the focus match state at the focus lens 210c and the drive quantity of the focus lens 210c.

As shown in FIG. 3B, the blur correction lens 210d is driven along a lateral axis 42 and a longitudinal axis 43 both extending perpendicular to the optical axis R. The lens CPU 203 detects drive quantities indicating the extents to which the blur correction lens 210d is driven as the drive condition information for the blur correction lens. Two sets of one-byte integral-value data indicate the drive quantities of the blur correction lens 210d. One set of the integral-value data indicates the drive quantity along the lateral axis 42 (lateral drive quantity) and the other set of integral-value data indicates the drive quantity along the longitudinal axis 43 (longitudinal drive quantity). Each drive quantity is indicated by a value taken in a range of −128 through +127. The lateral drive quantity takes a positive value when the blur correction lens is displaced along the direction indicated by an arrow 42f, whereas it takes a negative value when the blur correction lens is displaced along the direction indicated by an arrow 42b. Likewise, the longitudinal drive quantity takes a positive value when the blur correction lens is displaced along the direction indicated by an arrow 43f, whereas it takes a negative value when the blur correction lens is displaced along the direction indicated by an arrow 43b. As does the drive condition information for the focus lens 210f, the drive condition information for the blur correction lens 210d indicates the extent of displacement having occurred since the previous execution of drive condition information detection processing.

The drive quantities of the blur correction lens 210d are used for two separate purposes in the embodiment. Firstly, they are used by the autofocus adjustment device when fine-adjusting the focusing condition. In other words, the autofocus adjustment device executes focus adjustment based upon the drive quantities of the blur correction lens 210d. Image blur correction via the blur correction lens 210d is achieved by driving the blur correction lens 210d so as to shift the optical axis of the photographic optical system 210 based upon the extent of vibration to which the interchangeable lens 200 has been subjected. As the optical axis is shifted, the photographic optical system 210, having been in the focus match state, may become slightly out of focus. The autofocus adjustment device fine-adjusts the photographic optical system to sustain the focus match state based upon the drive quantities of the blur correction lens 210d. Secondly, the drive quantities are used by the body CPU 103 for purposes of fine adjustment through image processing. As the optical axis is shifted as described above, the quality of the photographic image may be slightly compromised. Accordingly, the body CPU 103 executes image processing of the known art based upon the drive quantities of the blur correction lens 210d so as to minimize such an adverse effect. It is desirable that the drive quantities of the blur correction lens 210d be used, at least, for the first purpose described above and also be used for the second purpose described above.

FIG. 3C shows the iris diaphragm 211 disposed on the optical axis R. The iris diaphragm 211 includes an opening 47 formed with a plurality of diaphragm blades. The lens CPU 203 detects the size of the opening 47 as the drive condition information. As does the drive condition information for the other optical members, the drive condition information pertaining to the iris diaphragm indicates the extent of change having occurred since the previous execution of the drive condition information detection processing. The drive condition information is provided as one-byte integral-value data, indicating a value in a range of −128 through +127. The integral value indicates the number of steps over which the diaphragm setting has been adjusted. It takes a positive value if the diaphragm is constricted, whereas it takes a negative value if the diaphragm is expanded. The integral value is detected with $1/12$-step resolution, and the lens CPU 203 detects an integral value of +1 as the drive condition information for the iris diaphragm 211 if, for instance, the diaphragm has been constricted by a $1/12$ step since the previous execution of the drive condition information detection processing.

The drive quantity of the iris diaphragm 211 is used by the body CPU 103 in order to detect the state of the iris diaphragm 211. After the body CPU 103 transmits a drive instruction for the lens CPU 203 so as to drive the iris diaphragm 211, a time lag corresponding to the state of the interchangeable lens 200 is bound to occur before the actual drive of the iris diaphragm 211 is completed. Since it is difficult to accurately estimate this time lag, the body CPU 103, having transmitted the drive instruction, normally waits in standby for a length of time considered to be sufficiently greater than the time lag so as to allow the drive of the iris diaphragm 211 to be completed, and only then does the body CPU execute the subsequent processing. Since the body CPU 103 in the embodiment is able to detect with a high level of reliability that the iris diaphragm 211 has been adjusted to achieve the specified opening size based upon the drive quantity of the iris diaphragm 211, the body CPU does not need to remain in the standby state any longer than necessary.

(First Embodiment) The camera system 1 achieved in the first embodiment of the present invention is described.

(Description of the Initialization Processing) As an interchangeable lens 200 is mounted at the camera body 100 in a power ON state, power supply to the interchangeable lens 200 starts. At this point, the body CPU 103 and the lens CPU 203 start executing initialization processing for the interchangeable lens 200.

FIGS. 4A through 4D each present an example of data that may be transmitted/received through the command data communication when the interchangeable lens 200 is initialized in the embodiment. In the initialization processing, various types of data necessary for control of the interchangeable lens 200 are transmitted/received through the command data communication.

Figure 4A:
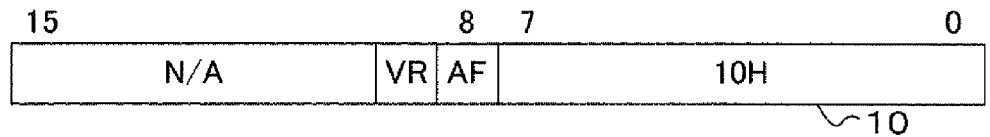
FIGS. 4A through 4D each present an example of data that may be transmitted/received through command data communication when initializing the interchangeable lens 200.

The lens CPU 203 engaged in the initialization processing transmits characteristics data 10 shown in FIG. 4A to the body CPU 103. The characteristics data 10 are two-byte data, with the lower-order byte data assuming an inherent value enabling identification of the data as characteristics data. The body CPU 103 checks the lower-order byte data in the received data and thus recognizes the received data as characteristics data. The individual bits in the higher-order byte data in the characteristics data 10 each correspond to a specific function of the interchangeable lens 200. In the example presented in FIG. 4A, the eighth bit (AF) in the characteristics data 10 corresponds to an autofocus adjustment function and the ninth bit (VR) in the characteristics data corresponds to a blur correction function. When the given bit value is 1 the corresponding function is available at the interchangeable lens 200. It is to be noted that any bit marked "N/A" in FIGS. 4A through 4D is data for which no meaning is defined in the embodiment. Namely, such a bit may take any value. This principle also applies to all bits thus marked in the subsequent drawings.

Figure 4B:
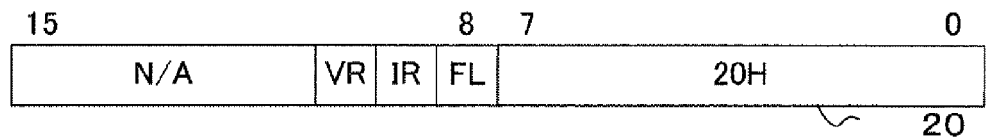

The lens CPU 203, having transmitted the characteristics data 10, then, transmits type data 20 such as those shown in FIG. 4B to the body CPU 103 in succession. The type data 20 are two-byte data indicating the types of drive condition information that the lens CPU 203 is able to transmit, with the lower-order byte data, as do the lower-order byte data in the characteristics data 10, constituting identifier data taking an inherent value indicating that the data are type data. The higher-order byte data in the type data 20 indicate the types of drive condition information that the interchangeable lens 200 is able to transmit through the hotline communication. In more specific terms, each bit corresponds to a specific type of transmittable drive condition information and, as long as the bit value is 1, the type of drive condition information corresponding to the particular bit can be transmitted from the lens CPU 203.

For instance, the eighth bit (FL), the ninth bit (IR) and the tenth bit (VR) in the type data 20 in FIG. 4B respectively correspond to the drive quantity of the focus lens 210c per unit time, the drive quantity of the iris diaphragm 211 per unit time and the drive quantities of the blur correction lens 210d per unit time. The body CPU 103 is able to recognize the specific types of drive condition information that can be transmitted from the interchangeable lens 200 through the hotline communication by referencing the various bits in the type data 20 that it has received.

The body CPU 103 having received the type data 20 executes decision-making processing in order to make a decision as to whether or not the body CPU 103 needs each type of drive condition information that the interchangeable lens 200 is able to transmit. Then, it transmits to the lens CPU 203 specification data 30, such as those shown in FIG. 4C, that indicate specific types of drive condition information having been judged to be necessary through the decision-making processing. The specification data 30 are two-byte data, and the lower-order byte data, as are the lower-order byte data in the characteristics data 10 and the type data 20, are identifier data taking an inherent value indicating that the data are specification data. The higher-order byte data in the specification data 30 indicate the types of drive condition information to be transmitted from the interchangeable lens 200 through the hotline communication. More specifically, as do the individual bits in the type data 20, the various bits in the specification data each correspond to a specific type of drive condition information, and whenever the body CPU 103 requests a specific type of drive condition information corresponding to a given bit, the particular bit is set to 1.

Figure 4C:
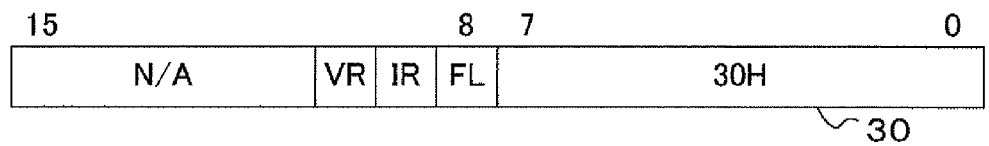

For instance, the eighth bit (FL), the ninth bit (IR) and the tenth bit (VR) in the specification data 30 in FIG. 4C respectively correspond to the drive quantity of the focus lens 210$c$ per unit time, the drive quantity of the iris diaphragm 211 per unit time and the drive quantities of the blur correction lens 210$d$ per unit time. When the camera body 100 has been set in an autofocus mode by the user, for instance, the autofocus adjustment device in the camera body 100 must be able to ascertain the drive quantity of the focus lens 210$c$ for purposes of autofocus adjustment. Accordingly, through the decision-making processing described above, the body CPU 103 decides that the drive quantity of the focus lens 210$c$ is required. The body CPU then transmits specification data 30 with the eighth bit set to 1 to the interchangeable lens 200. If, on the other hand, the camera body 100 is currently set in a manual focus mode, the autofocus adjustment device is not engaged in operation and thus, the camera body 100 does not need the drive quantity of the focus lens 210$c$. In this case, the body CPU 103 transmits to the interchangeable lens 200 specification data 30 with the eighth bit set to 0.

The body CPU 103 executing the decision-making processing decides that drive condition information is not needed under the following circumstances. For instance, the interchangeable lens 200 may be a newer interchangeable lens manufactured later than the camera body 100 and may, therefore, be capable of transmitting a new type of drive condition information not anticipated by the camera body 100. In such a case, the camera body 100, not knowing how such drive condition information may be utilized, will decide that the particular type of drive condition information is not needed. In addition, the camera body 100 may be a low-end camera body equipped with limited functions and may not be capable of executing advanced control requiring a specific type of drive condition information. In such a case, too, the particular type of drive condition information will be judged unnecessary.

The body CPU 103 then determines the frequency with which the lens CPU 203 is to transmit each type of drive condition information. Under normal circumstances, the drive condition information requested through the specification data 30 is transmitted each time the body CPU 103 executes the hotline communication. However, the body CPU 103 is able to adjust the transmission frequency with which the lens CPU 203 transmits the drive condition information by transmitting frequency data 40, such as those shown in FIG. 4D, to the lens CPU 203. The frequency data 40 are three-byte data. The two lower-order byte data are similar to the specification data 30, indicating an inherent value provided as an identifier for the frequency data and the types of drive condition information with specified frequencies. Namely, as the individual bits in the specification data 30 do, the various bits each correspond to a specific type of drive condition information, and a bit set to 1 indicates that a transmission frequency is specified by the body CPU 103 for the type of drive condition information corresponding to the particular bit.

The highest-order byte data (NUM) in the frequency data 40 indicate an integral value in the range of 1 to 255, representing the transmission frequency for a specific type of drive condition information. For instance, if the highest-order byte data in the frequency data 40 indicate an integral value "3", the drive condition information will be transmitted every third time through the hotline communication. The camera body 100 in the embodiment requests that the interchangeable lens 200 mounted thereat transmit the drive quantity of the iris diaphragm 211 per unit time, "every second time" and that the interchangeable lens 200 mounted thereat transmit the drive quantities of the blur correction lens 210$d$ per unit time "every third time". However, it does not specify any transmission frequency with regard to the drive quantity of the focus lens 210$c$ per unit time. This means that the drive condition information pertaining to the focus lens 210$c$ is transmitted each time the hotline communication is conducted, and that the drive condition information pertaining to the iris diaphragm 211 and the drive condition information pertaining to the blur correction lens 210$d$ are transmitted in addition to the drive condition information pertaining to the focus lens 210$c$ respectively with frequencies of every second time and every third time.

As described above, the lens CPU 203 of the interchangeable lens 200 having been mounted at the camera body 100 transmits the type data 20 indicating the types of drive condition information that the lens CPU 203 is capable of transmitting. In response, the body CPU 103 transmits the specification data 30 indicating specific types of requested drive condition information and the frequency data 40 specifying transmission frequencies with which the types of drive condition information are to be transmitted.

(Description of the Drive Condition Information Detection Processing) Upon completing the initialization processing, the body CPU 103 issues a request for a hotline communication start to the lens CPU 203 over a predetermined cycle (e.g., every millisecond). The lens CPU 203 having received the hotline communication start request issued from the camera body 100 executes the drive condition information detection processing. The shift in the signal level at the specific signal line described earlier constitutes the hotline communication start request in this situation.

Through the drive condition information detection processing, the drive condition information to be transmitted to the body CPU 103 is detected from the corresponding optical members. Namely, any drive condition information with the corresponding bit value set to 0 in the specification data 30 having been transmitted from the body CPU 103 in the initialization processing described above is not detected through the detection processing. In addition, any drive condition information having a specific frequency value set in the frequency data 40 is detected with the specified frequency. For instance, if drive condition information with its frequency value indicating "every second time" has been detected through the preceding detection processing session, the particular type of drive condition information will not be detected in the current detection processing session.

(Description of the Drive Condition Information Transmission Processing) Upon executing the drive condition information detection processing, the lens CPU 203 executes drive condition information transmission processing. The individual types of drive condition information, having been detected through the drive condition information detection processing, is transmitted by the lens CPU 203 to the body CPU 103 through the drive condition information transmission processing.

Figure 5A:
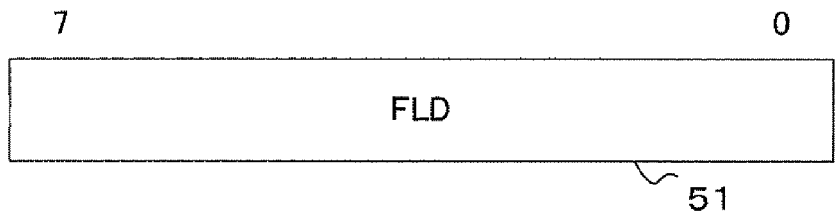
FIGS. 5A through 5E each illustrate a data format assumed in conjunction with the drive condition information.
Figure 5B:
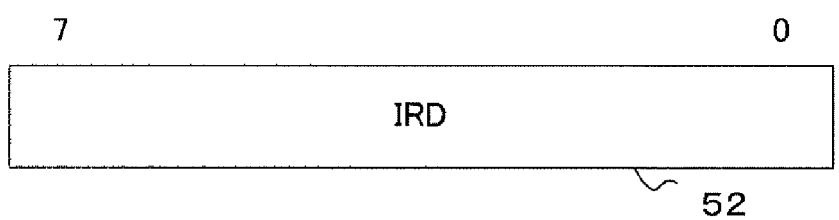
Figure 5C:
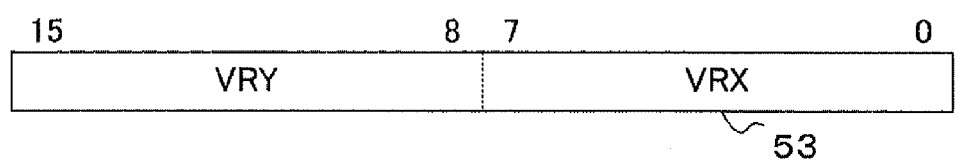

FIGS. 5A through 5E each illustrate a drive condition information data format. FIGS. 5A through 5C respectively show FL data 51 indicating the drive quantity of the focus lens 210c, IR data 52 indicating the drive quantity of the iris diaphragm 211 and VR data 53 indicating the drive quantities of the blur correction lens 210d. As explained earlier, the drive quantity of the focus lens 210c and the drive quantity of the iris diaphragm 211 are each detected as one-byte integral-value data. Accordingly, the sizes of the FL data 51 and the IR data 52 are both one byte, as indicated in FIGS. 5A and 5B.

In addition, the drive quantities of the blur correction lens 210d along the left/right direction and the drive quantities of the blur correction lens 210d along the up/down direction are each detected as one-byte integral-value data. In correspondence, the VR data 53 are provided as two-byte data with the lower-order byte data indicating the left/right direction drive quantity VRX and the higher-order byte data indicating the up/down direction drive quantity VRX, as illustrated in FIG. 5C.

The lens CPU 203 creates transmission data to be transmitted to the body CPU 103 through the hotline communication by stringing together these data in a predetermined order. The transmission data do not include any drive condition information that has not been detected through the drive condition information detection processing.

Figure 5D:
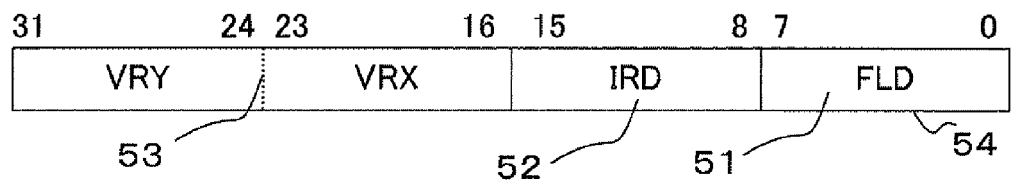
Figure 5E:
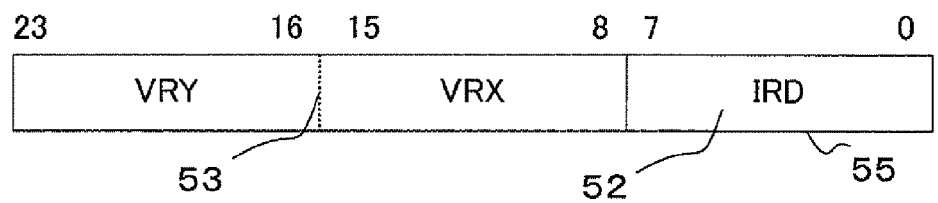

For instance, FIG. 5D presents an example of transmission data 54 that may be generated when the specification data 30 having been transmitted from the body CPU 103 indicate that all the drive condition information is needed. In this situation, the lens CPU 203 strings together all the types of drive condition information having been specified as necessary information by the body CPU 103 by sequentially linking the data indicating the drive quantity of the focus lens 210c, which are to constitute the lower-order byte data, to the data indicating the drive quantity of the iris diaphragm 211, which are to constitute the second lower-order byte data, and then by sequentially linking the data to the data indicating the drive quantities of the blur correction lens 210d. If, on the other hand, the CPU 103 decides that the drive condition information indicating the drive quantity of the focus lens 210c is not needed, transmission data 55 will be created, as shown in FIG. 5E. Likewise, if the frequency data 40 have been transmitted by the body CPU 103, transmission data containing a specific type of drive condition information with a frequency value indicated in the frequency data and transmission data that do not contain the particular type of drive condition information will be created in a specific pattern.

Figure 6:
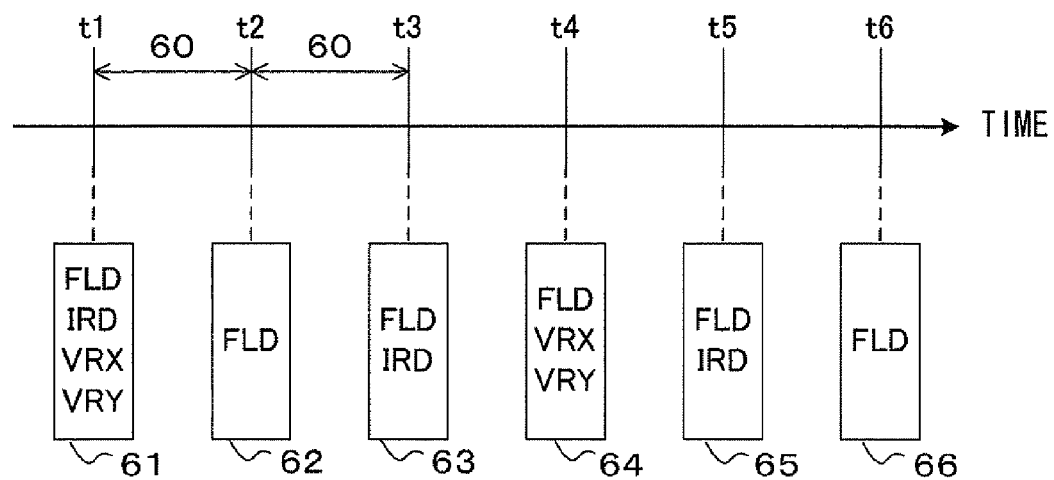
FIG. 6 presents an example of transmission data with specific transmission frequencies set with frequency data 40.

FIG. 6 presents an example of transmission data that may be created when transmission frequencies are specified in the frequency data 40. In this example, the body CPU 103 has indicated in the specification data 30 that all the types of drive condition information are to be transmitted. In addition, the frequency data 40 indicate that no specific frequency value has been set for the drive quantity of the focus lens 210c, that a transmission frequency value specifying "every second time" has been set for the drive quantity of the iris diaphragm 211 and that a transmission frequency value specifying "every third time" has been set for the drive quantities of the blur correction lens 210d.

As described earlier, the body CPU 103 executes the hotline communication over a predetermined cycle (a predetermined period) 60. Since no specific frequency value has been set for the drive quantity of the focus lens 210c, sets of transmission data 61 to 66 transmitted from the lens CPU 203 through the hotline communication executed at time points t1 to t6 invariably include the FL data 51. While the IR data 52, for which a transmission frequency of "every second time" is specified, are included in the transmission data 61, 63 and 65 transmitted at the time points t1, t3 and t5, the IR data 52 are not included in the other sets of transmission data 62, 64 and 66. Likewise, the VR data, for which a transmission frequency of "every third time" has been specified, are included in the transmission data 61 and 64 transmitted at the time points t1 and t4 alone.

As described above, the lens CPU 203 selectively transmits the specific types of drive condition information, indicated in the specification data 30, through the first transmission path 301 to the camera body 100 repeatedly. In addition, any type of drive condition information for which a transmission frequency is specified in the frequency data 40 is transmitted with the specified frequency.

The following advantages are achieved with the camera system in the first embodiment described above.

(1) The lens CPU 203 transmits the drive condition information pertaining to the focus lens 210c each time the hotline communication is conducted and also transmits the drive condition information pertaining to the iris diaphragm 211 by adding it to the drive condition information pertaining to the focus lens 210c every second time. Through these measures, the calculation load on the lens CPU 203 for the drive condition information communication is reduced.

(2) The lens CPU 203 transmits the drive condition information pertaining to the iris diaphragm 211 with the frequency indicated in the frequency data 40 it has received from the camera body 100. As a result, each type of drive condition information can be transmitted at the optimal frequency with which the particular type of information is needed at the camera body.

(3) The lens CPU 203 transmits the various types of drive condition information to the camera body 100 via the first transmission path 301 and receives the frequency data 40 from the camera body 100 via the second transmission path 302. Through these measures, it is ensured that the communication in progress through one transmission never interferes with communication in progress through the other transmission path.

(4) The body CPU 103 transmits to the interchangeable lens 200 frequency data 40 indicating that the drive condition information pertaining to the iris diaphragm 211 is to be transmitted every second time. Subsequently, the body CPU 103 receives the drive condition information pertaining to the iris diaphragm 211 every second time.

Thus, the drive condition information for the iris diaphragm 211 can be received with the frequency optimal for the processing executed at the body CPU 103, without having to execute any unnecessary communication.

(Second Embodiment) While the camera system achieved in the second embodiment includes components similar to those in the first embodiment, transmission data adopting a format different from that of the first embodiment are transmitted/received in the second embodiment. The following is a description of the format of the transmission data transmitted by the lens CPU 203 in the camera system achieved in the second embodiment.

Figure 7A:
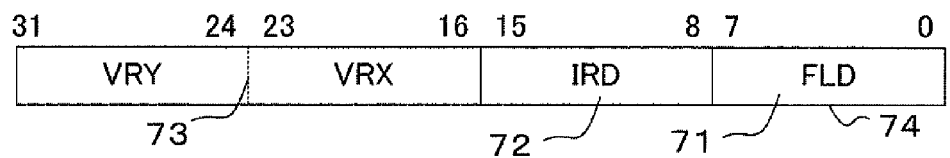
FIGS. 7A and 7B present examples of transmission data that may be transmitted in the second and sixth embodiments.
Figure 7B:
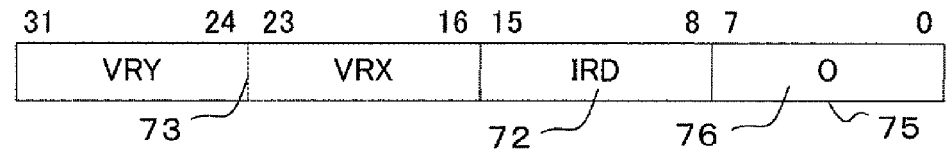

FIGS. 7A and 7B presents examples of transmission data that may be transmitted in the second embodiment. In the embodiment, transmission data with a fixed length are invariably transmitted through the hotline communication.

Namely, the transmission data always assume a four-byte length, with the FL data, the IR data and the VR data (two bytes) stored in this order with the FL data constituting the lowest-order byte data.

When the transmission data do not include a specific type of drive condition information, e.g., when the specification data indicate that a specific type of drive condition information is not to be transmitted or when a specific type of drive condition information is not transmitted in conformance to a frequency instruction included in the frequency data, various types of drive condition information minus the specific type of drive condition information are strung together in a predetermined order, as indicated in FIG. 5E in the first embodiment. As an alternative, the specific type of drive information is replaced with dummy data with all the bits thereof indicating "0" in the current embodiment. Namely, the lens CPU 203 transmits transmission data 74 that include all the drive condition information as shown in FIG. 7A in order to provide all types of drive condition information. However, if FL data 71 are not to be transmitted, the lens CPU 203 transmits transmission data 75, which include the dummy data 76 with all the bits thereof indicating "0", replacing the FL data 71, as shown in FIG. 7B. In this case, the body CPU 103 handles the dummy data 76 as "data indicating that the corresponding drive condition information has been excluded by the lens CPU 203".

Advantages similar to those of the camera system in the first embodiment are achieved through the camera system in the second embodiment described above.

(Third Embodiment) While the camera system achieved in the third embodiment includes components similar to those in the first embodiment, the body CPU 103 specifies an update cycle (an update period) with which drive condition information is to be updated through cycle data (period data) instead of specifying a drive condition information transmission frequency with the frequency data. The lens CPU 203, in turn, updates the drive condition information stored in the memory 214 (see FIG. 2) with the cycle (the period) specified in the cycle data and transmits all the drive condition information stored in the memory 214 each time the hotline communication is conducted. At this time, if drive condition information in the memory 214 has not been updated since the previous hotline communication, drive condition information identical to that having been transmitted through the previous hotline communication will be transmitted.

Figure 8:
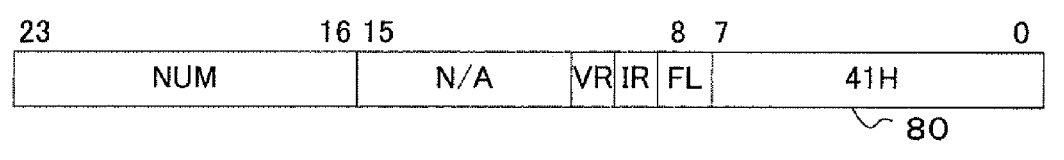

FIG. 8 shows the structure of the cycle data transmitted by the body CPU 103. The cycle data 80 are used to specify a cycle over which each type of drive condition information is to be updated by the lens CPU 203. The lens CPU 203 in the embodiment executes drive condition information detection processing for detecting the types of drive condition information specified in the specification data 30 each time the body CPU 103 issues a hotline communication start request. Through this detection processing, the drive condition information corresponding to each optical member is detected. The detected drive condition information is then stored into the memory 214 (see FIG. 2) within the interchangeable lens 200. At this time, the old drive condition information of a given type currently stored in the memory 214 is updated with the newly detected drive condition information of the matching type. Subsequently, the lens CPU 203 executes drive condition information transmission processing. In the drive condition information transmission processing, all the drive condition information stored in the memory 214 is transmitted from the lens CPU 203 to the body CPU 103 as data adopting a format similar to that described in reference to the first embodiment.

The body CPU 103 in the embodiment transmits the cycle data 80 shown in FIG. 8 instead of the frequency data described in reference to the first embodiment. The lens CPU 203 is able to alter a drive condition information update cycle based upon cycle data 80 such as those shown in FIG. 8 transmitted from the body CPU 103 to the lens CPU 203. The cycle data 80 are three-byte data. The lower order two-byte data, are similar to the specification data 30, and indicate an inherent value identifying the data as cycle data and the types of drive condition information for which specific cycles are set. In other words, as do the bits in the specification data 30, the individual bits each correspond to a specific type of drive condition information, and the bit value of 1 indicates that the body CPU 103 has specified an update cycle for the type of drive condition information corresponding to the particular bit.

The highest-order byte data (NUM) in the cycle data 80 indicate an integral value in the range of 1 to 255, representing the update cycle for a specific type of drive condition information. For instance, if the highest-order byte data in the cycle data 80 indicate an integral value "3", the lens CPU 203 will update the particular type of drive condition information every three milliseconds. In this case, assuming that the hotline communication is conducted every millisecond, the particular type of drive condition information holding a value remaining unchanged will be transmitted through 3 successive hotline communications.

The following advantages are achieved in the camera system in the third embodiment described above.

(1) The lens CPU 203 updates the drive condition information for the iris diaphragm 211 stored in the memory 214 over a cycle longer than that of the drive condition information pertaining to the focus lens 210c. It then transmits the various types of drive condition information stored in the memory 214 each time the hotline communication is conducted. As a result, the calculation load placed on the lens CPU for the drive condition information communication is reduced.

(2) The lens CPU 203 updates the drive condition information for the iris diaphragm 211 with a specific cycle indicated in the cycle data 80 having been received from the camera body 100. Through these measures, it is ensured that each type of drive condition information is updated with the optimal cycle requested by the camera body.

(3) The lens CPU 203 transmits the various types of drive condition information to the camera body 100 via the first transmission path 301 and receives the cycle data 80 from the camera body 100 via the second transmission path 302. Through these measures, it is ensured that the communication in progress through one transmission never interferes with communication in progress through the other transmission path.

Figure 9:
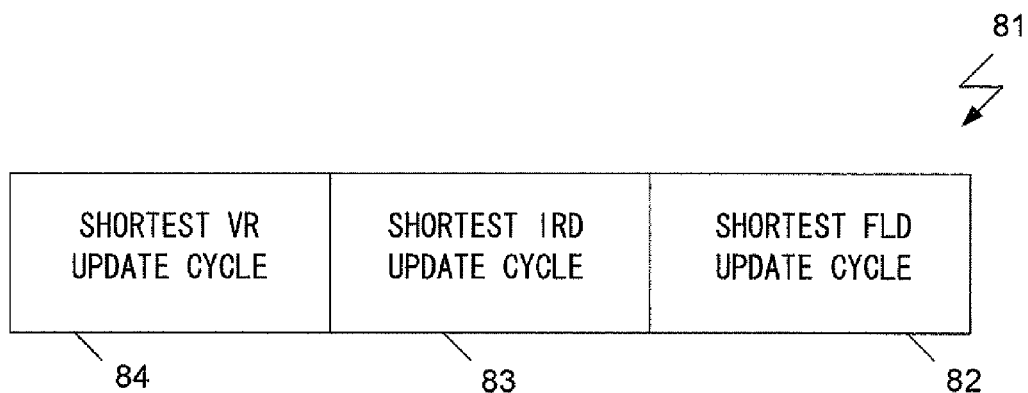
FIG. 9 shows shortest cycle data (shortest cycle data) 81.

(Fourth Embodiment) While the camera system achieved in the fourth embodiment includes components similar to those in the first embodiment, the lens CPU 203 in the fourth embodiment transmits through an initial communication shortest cycle data (shortest period data) indicating the shortest cycles (the shortest periods) over which drive condition information can be updated. The shortest cycle data indicate the shortest cycles with which the lens CPU 203 is able to update the individual types of drive condition information. In other words, the shortest cycle data include data indicating the shortest cycle with which the FL data can be updated, data indicating the shortest cycle with which the IR data can be updated and data indicating the shortest cycle with which the VR data can be updated. FIG. 9 shows shortest cycle data 81. As shown in FIG. 9, the shortest cycle data 81 include data 82 indicating the shortest cycle with which the FL data can be updated, data 83 indicating the shortest cycle with which the IR data can be updated and data 84 indicating the shortest cycle with which the VR data can be updated.

The body CPU 103 receives the shortest cycle data 81 described above through the initial communication. Then, based upon the shortest cycle data having been received, it transmits cycle data 80. More specifically, it structures the cycle data 80 by ensuring that it does not provide the lens CPU 203 with instructions indicating that any type of drive condition information should be updated with a cycle less than the shortest update cycle, i.e., with a cycle shorter than the shortest update cycle. For instance, if the shortest cycle with which the IR data can be updated is two milliseconds, the body CPU 103 never issues an instruction for the lens CPU 203 for updating the IR data every millisecond. Rather, the body CPU 103 issues an instruction for the lens CPU 203 so that the IR data are updated with a cycle of at least two milliseconds.

The following advantage is achieved with a camera system in the fourth embodiment described above.

(1) The lens CPU 203 transmits to the camera body the shortest cycle data 81, indicating the shortest cycles with which the various types of drive condition information can be updated. The body CPU 103, in turn, transmits to the lens CPU 203, the cycle data 80 indicating update cycles that are not shorter than the shortest cycles indicated in the shortest cycle data having been received. Consequently, the camera body never issues instructions for updating the drive condition information over impossibly short update cycles.

(Fifth Embodiment) The camera system 1 achieved in the fifth embodiment of the present invention is now described.

Figure 10:
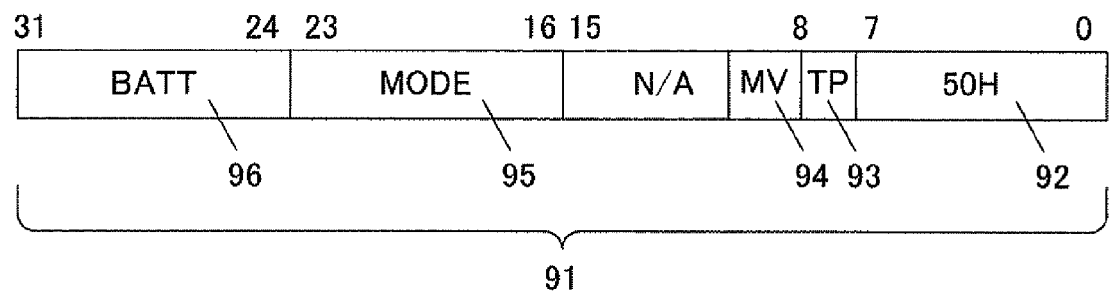
FIG. 10 shows body operation information.

(Description of the Body Operation Information) FIG. 10 shows body operation information. The body CPU 103 transmits body operation information 91 pertaining to the operating state of the camera body 100 over a predetermined cycle (e.g., every 16 milliseconds) through the command data communication. It is desirable that the body operation information transmission cycle be longer than the hotline communication execution cycle, since the command data communication is bound to be more time-consuming than the hotline communication.

The body operation information 91 achieved in the embodiment is four-byte data, and includes first information 93, second information 94, third information 95 and fourth information 96 to be described in detail below, as well as an inherent value 92 that enables identification of the body operation information 91. It is to be noted that any bit marked "N/A" in FIG. 10 is data for which no meaning is defined in the embodiment. Namely, such a bit may take any value. This principle also applies to all bits thus marked in the subsequent drawings.

The first information 93 is one-bit information indicating whether or not the camera body 100 is locked to a tripod. The body CPU 103 may determine whether or not the camera body 100 is locked to a tripod by, for instance, monitoring an output from a vibration detection sensor included in a vibration correction mechanism and comparing the extent of vibration occurring along a specific direction to the extent of vibration occurring along another direction.

The second information 94 is one-bit information indicating whether a setting for shooting still images or a setting for shooting video is currently selected in the camera body 100. As in the case of digital cameras in the related art, the camera system 1 achieved in the embodiments can be set to a mode often referred to as a still image shooting mode or a mode often referred to as a video shooting mode.

The third information 95 is one-byte information indicating a photographing mode currently set in the camera body 100. Any of various modes, such as a manual exposure mode, a shutter speed priority mode, an aperture priority mode, a program auto mode, a sports mode and a landscape mode, can be set as the photographing mode at the camera body 100 in the embodiment. The third information 95 indicates a value different from any other in correspondence to a specific photographing mode.

During the shooting operation, the body CPU 103 controls various parameters (e.g., the shutter speed, the aperture value and the like) for the shooting operation based upon the photographing mode set at the camera body 100. For instance, if the sports mode is currently set at the camera body, the shutter speed is raised in order to capture a fast-moving subject. If, on the other hand, the landscape mode is currently set at the camera body, the aperture is further constricted in order to focus on all the subjects present within the angle of field.

The fourth information 96 is one-byte information indicating the remaining power available in a battery 215 (see FIG. 2) within the camera body 100. The fourth information 96 indicates a value of 0 when the remaining power in the battery is 0% and indicates a value of 255 when the remaining power in the battery is 100%. The various units constituting the camera body 100 and the various parts of the interchangeable lens 200 operate on the power provided from the battery 215 or power provided from a power source circuit that converts the voltage or the like of the power from the battery.

Figure 4D:
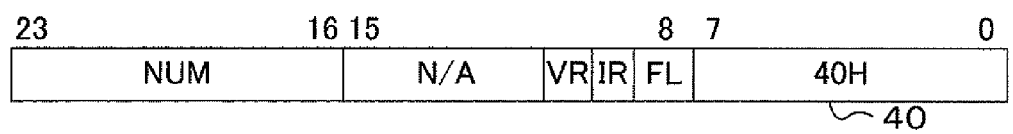

(Description of the Initialization Processing) As an interchangeable lens 200 is mounted at the camera body 100 in a power ON state, power supply to the interchangeable lens 200 starts. At this point, the body CPU 103 and the lens CPU 203 start executing initialization processing for the interchangeable lens 200. The initialization processing executed in the current embodiment, which is otherwise identical to the initialization processing executed in the first embodiment as shown in FIGS. 4A through 4D, is unique in that the frequency data 40 shown in FIG. 4D are not used.

FIGS. 4A through 4C each present an example of data that may be transmitted/received through the command data communication when the interchangeable lens 200 is initialized in the embodiment. In the initialization processing, various types of data necessary for control of the interchangeable lens 200 are exchanged through the command data communication.

The lens CPU 203 engaged in the initialization processing transmits characteristics data 10 shown in FIG. 4A to the body CPU 103. The characteristics data 10 are two-byte data, with the lower-order byte data assuming an inherent value enabling identification of the data as characteristics data. The body CPU 103 checks the lower-order byte data in the received data and thus recognizes the received data as characteristics data. The individual bits in the higher-order byte data in the characteristics data 10 each correspond to a specific function of the interchangeable lens 200. In the example presented in FIG. 4A, the eighth bit (AF) in the characteristics data 10 corresponds to an autofocus adjustment function and the ninth bit (VR) in the characteristics data corresponds to a blur correction function. When a given bit value is 1, the corresponding function is available at the interchangeable lens 200.

The lens CPU 203, having transmitted the characteristics data 10, then transmits type data 20 such as those shown in FIG. 4B to the body CPU 103 in succession. The type data 20 are two-byte data indicating the types of drive condition information that the lens CPU 203 is able to transmit, with the lower-order byte data, as do the lower-order byte data in the characteristics data 10, constituting identifier data taking an inherent value indicating that the data are type data. The higher-order byte data in the type data 20 indicate the types of drive condition information that the interchangeable lens 200 is able to transmit through the hotline communication. In more specific terms, each bit corresponds to a specific type of transmittable drive condition information and, as long as the bit value is 1, the type of drive condition information corresponding to the particular bit can be transmitted from the lens CPU 203.

For instance, the eighth bit (FL), the ninth bit (IR) and the tenth bit (VR) in the type data 20 in FIG. 4B respectively correspond to the drive quantity of the focus lens 210c per unit time, the drive quantity of the iris diaphragm 211 per unit time and the drive quantities of the blur correction lens 210d per unit time. The body CPU 103 is able to recognize the specific types of drive condition information that can be transmitted from the interchangeable lens 200 through the hotline communication by referencing the various bit data in the type data 20 that it has received.

The body CPU 103 having received the type data 20 executes decision-making processing in order to make a decision as to whether or not the body CPU 103 needs each type of drive condition information that the interchangeable lens 200 is able to transmit. Then, it transmits to the lens CPU 203 specification data 30, such as those shown in FIG. 4C, that indicate specific types of drive condition information having been judged to be necessary through the decision-making processing. The specification data 30 are two-byte data, and the lower-order byte data, as are the lower-order byte data in the characteristics data 10 and the type data 20, are identifier data taking an inherent value indicating that the data are specification data. The higher-order byte data in the specification data 30 indicate the types of drive condition information to be transmitted from the interchangeable lens 200 through the hotline communication. More specifically, as do the individual bits in the type data 20, the various bits in the specification data each correspond to a specific type of drive condition information, and whenever the body CPU 103 requests a specific type of drive condition information corresponding to a given bit, the particular bit is set to 1.

For instance, the eighth bit (FL), the ninth bit (IR) and the tenth bit (VR) in the specification data 30 in FIG. 4C respectively correspond to the drive quantity of the focus lens 210c per unit time, the drive quantity of the iris diaphragm 211 per unit time and the drive quantities of the blur correction lens 210d per unit time. When the camera body 100 has been set in an autofocus mode by the user, for instance, the autofocus adjustment device in the camera body 100 must be able to ascertain the drive quantity of the focus lens 210c for purposes of autofocus adjustment. Accordingly, through the decision-making processing described above, the body CPU 103 decides that the drive quantity of the focus lens 210c is required. The body CPU then transmits specification data 30 with the eighth bit set to 1 to the interchangeable lens 200. If, on the other hand, the camera body 100 is currently set in a manual focus mode, the autofocus adjustment device is not engaged in operation and thus, the camera body 100 does not need the drive quantity of the focus lens 210c. In this case, the body CPU 103 transmits to the interchangeable lens 200 specification data 30 with the eighth bit set to 0.

The body CPU 103 executing the decision-making processing, decides that drive condition information is not needed under the following circumstances. For instance, the interchangeable lens 200 may be a newer interchangeable lens manufactured later than the camera body 100 and may, therefore, be capable of transmitting a new type of drive condition information not anticipated by the camera body 100. In such a case, the camera body 100, not knowing how such drive condition information may be utilized, will decide that the particular type of drive condition information is not needed. In addition, the camera body 100 may be a low-end camera body equipped with limited functions and may not be capable of executing advanced control requiring a specific type of drive condition information. In such a case, too, the particular type of drive condition information will be judged unnecessary.

As described above, the lens CPU 203 of the interchangeable lens 200 having been mounted at the camera body 100 transmits the type data 20 indicating the types of drive condition information that the lens CPU 203 is capable of transmitting. In response, the body CPU 103 transmits the specific data 30 indicating specific types of drive condition information that are requested.

(Description of the Drive Condition Information Detection Processing) Upon completing the initialization processing, the body CPU 103 issues a request for a hotline communication start to the lens CPU 203 over a predetermined cycle (e.g., every millisecond). The lens CPU 203 having received the hotline communication start request issued by the camera body 100 executes the drive condition information detection processing. The shift in the signal level at the specific signal line described earlier constitutes the hotline communication start request in this situation.

Through the drive condition information detection processing, the drive condition information to be transmitted to the body CPU 103 is detected from the corresponding optical members. Namely, any drive condition information with the corresponding bit value set to 0 in the specification data 30 having been transmitted from the body CPU 103 in the initialization processing described above is not detected through the detection processing.

(Description of the Drive Condition Information Transmission Processing) Upon executing the drive condition information detection processing, the lens CPU 203 executes drive condition information transmission processing. The individual types of drive condition information having been detected through the drive condition information detection processing is transmitted by the lens CPU 203 to the body CPU 103 through the drive condition information transmission processing.

Figure 11A:
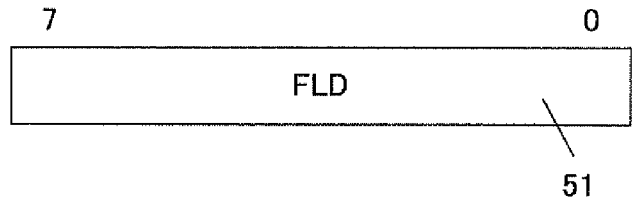
FIGS. 11A through 11E each present an example of data that may be transmitted/received through command data communication when initializing the interchangeable lens 200.
Figure 11B:
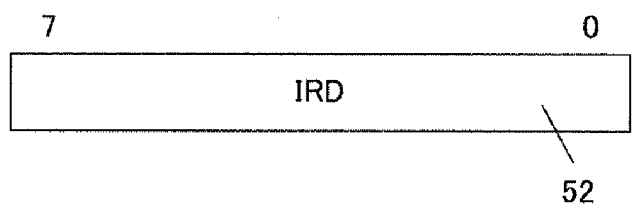
Figure 11C:
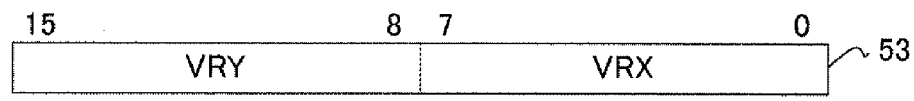

FIGS. 11A through 11E each illustrate a drive condition information data format. FIGS. 11A through 11C respectively show FL data 51 indicating the drive quantity of the focus lens 210c, IR data 52 indicating the drive quantity of the iris diaphragm 211 and VR data 53 indicating the drive quantities of the blur correction lens 210d. Since the FL data 31, the IR data 52 and the VR data 53 shown in FIGS. 11A through 11C are similar to the data described in reference to FIGS. 5A through 5C, a repeated explanation is not provided. As explained earlier, the drive quantity of the focus lens 210c and the drive quantity of the iris diaphragm 211 are each detected as one-byte integral-value data. Accordingly, the sizes of the FL data 51 and the IR data 52 are both one byte, as indicated in FIGS. 11A and 11B.

In addition, the drive quantities of the blur correction lens 210d along the left/right direction and the drive quantities of the blur correction lens 210d along the up/down direction are each detected as one-byte integral-value data. In correspondence, the VR data 53 are provided as two-byte data with the lower-order byte data indicating the left/right direction drive quantity VRX and the higher-order byte data indicating the up/down direction drive quantity VX, as shown in FIG. 11C.

The lens CPU 203 creates transmission data to be transmitted to the body CPU 103 through the hotline communication by stringing together these data in a predetermined order.

The transmission data do not include any drive condition information that has not been detected through the drive condition information detection processing. In addition, type data indicating the types of drive condition information included in the transmission data are appended to the leading end of the transmission data.

Figure 11D:
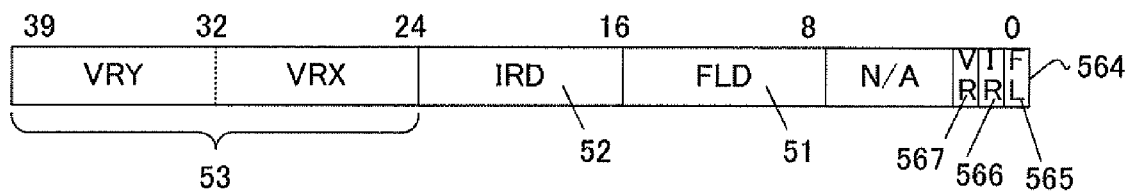

For instance, FIG. 11D presents an example of transmission data 564 that may be generated when the specification data 30 having been transmitted from the body CPU 103 indicate that all the drive condition information is needed. In this situation, the lens CPU 203 strings together all the types of drive condition information having been specified as necessary information by the body CPU 103 by linking from lower-order byte data to higher-order byte data, the data indicating the drive quantity of the focus lens 210c, the data indicating the drive quantity of the iris diaphragm 211 and the drive quantities of the blur correction lens 210d in this order. Data 565 indicating the presence/absence of the FL data 51, data 566 indicating the presence/absence of the IR data 52 and data 567 indicating the presence/absence of the VR data 53 are appended as the lowest-order byte data in the transmission data 564. These data constitute type data indicating the types of drive condition information included in the transmission data 564. The type data take either a value of 0 or a value of 1. The value of 1 indicates that the corresponding data are included in the transmission data. The data 565, the data 566 and the data 567 in the transmission data 564 in FIG. 11D, therefore all indicate the value of 1.

Figure 11E:
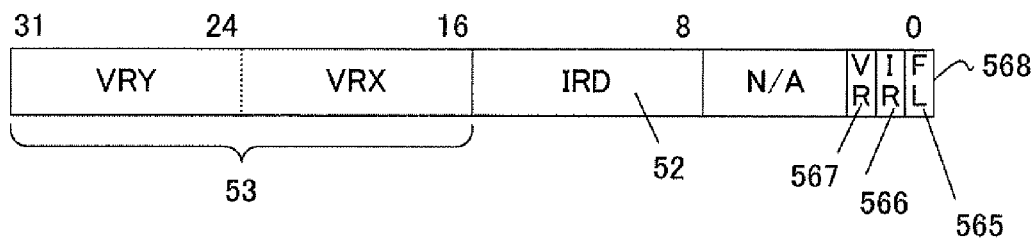

If, on the other hand, the body CPU 103 decides that the drive condition information indicating the drive quantity of the focus lens 210c, in particular, is not needed, transmission data 568 will be created, as shown in FIG. 11E. These transmission data 568 do not include the FL data 51. Accordingly, the data 565 indicating the presence/absence of the FL data 51 take a value of 0. The body CPU 103 having received transmission data first checks the individual bits in the lowest-order byte data in order to determine the types of drive condition information included in the transmission data.

(Description of the Processing Pertaining to the Body Operation Information) Upon completing the initialization processing, the body CPU 103 transmits body operation information 91 with a predetermined cycle (e.g., every 16 milliseconds) to the lens CPU 203. The body operation information 91 is transmitted through the command data communication. The lens CPU 203, having received the body operation information 91 from the camera body 100, then determines the transmission frequencies with which the individual types of drive condition information are to be transmitted based upon the body operation information 91. More specifically, based upon the operating state of the camera body 100, the lens CPU 203 determines a frequency with which each type of drive condition information is to be transmitted.

As described earlier, the body CPU 103 issues a request for a hotline communication start with a predetermined cycle (e.g., every millisecond) to the lens CPU 203. While the lens CPU 203 executes the drive condition information detection processing and the drive condition information transmission processing in response, the lens CPU 203 does not always detect or transmit every type of drive condition information through the drive condition information detection processing or the drive condition information transmission processing.

The lens CPU 203 in the embodiment detects and transmits, in principle, the FL data 51 indicating the drive quantity of the focus lens 210c in response to each hotline communication start request. However, the lens CPU 203 alters the transmission frequencies of the IR data 52 indicating the drive quantity of the iris diaphragm 211 and the VR data 53 indicating the drive quantities of the blur correction lens 210d based upon the body operation information 91.

The transmission frequencies for these data are each indicated as a ratio to the transmission frequency of the FL data 51. For instance, data, the transmission frequency of which is set as "once every two FL data transmissions" will be appended to the FL data 51 and transmitted in this form through one of every two consecutive hotline communications. The following is a description of specific examples of transmission frequencies determined by the lens CPU 203 based upon the body operation information 91 in various situations.

For instance, if the camera body 100 is locked to a tripod, the extent of vibration of the camera body 100 is bound to be smaller than the extent of vibration that a hand-held camera will be subjected to. Thus, the drive quantities of the blur correction lens 210d will not be a critical factor. In other words, the drive quantities of the blur correction lens 210d do not need to be transmitted with high frequency. Accordingly, if the first information 93 included in the body operation information 91 indicates that the camera body 100 is locked to a tripod, the lens CPU 203 will lower the transmission frequency for the drive quantities of the blur correction lens 210d from "every second time" to, for instance, "every tenth time".

When the video shooting mode is set at the camera body 100, control is executed so as to set a more moderate speed for drive of the iris diaphragm 211 than the speed set in the still image shooting mode, since an abrupt change in the extent of constriction of the iris diaphragm 211 during a video shooting operation will result in an unnatural looking image due to an excessively large change in the amount of light from one frame to another. Accordingly, the drive quantity of the iris diaphragm 211 does not need to be transmitted with high frequency while the video shooting mode is set at the camera body. For this reason, when the second information 94 included in the body operation information 91 indicates the video shooting mode, the lens CPU 203 will lower the transmission frequency for the drive quantity of the iris diaphragm 211 from "every second time" to "every tenth time".

The frequency with which the iris diaphragm 211 is engaged in operation is bound to be lower when the manual exposure mode and the aperture priority mode is selected at the camera body 100, compared to the operation frequency of the iris diaphragm when any other photographing mode is selected, since the extent to which the iris diaphragm 211 is constricted is altered exclusively through a user operation when the manual exposure mode or the aperture priority mode is selected, whereas the extent to which the iris diaphragm 211 is constricted changes in correspondence to photometering results if a photographing mode other than the manual exposure mode or the aperture priority mode is selected. Accordingly, the drive quantity for the iris diaphragm 211 does not need to be transmitted with high frequency, as long as the manual exposure mode or the aperture priority mode is selected. Thus, if the third information 95 included in the body operation information 91 indicates the manual exposure mode or the aperture priority mode, the lens CPU 203 will lower the transmission frequency for the drive quantity of the iris diaphragm 211 from, for instance, "every second time" to "every tenth time".

When the sports mode is set at the camera body 100, the photographic field can be expected to contain a more dynamic subject than in another photographing mode. If, on the other hand, the landscape mode is currently set at the camera body 100, the photographic field is likely to contain a less dynamic subject than in another photographing mode. In other words, the expected level of subject dynamism varies depending upon the photographing mode. Accordingly, whenever the expected level of subject dynamism is high, as in the sports mode, the drive quantities of the blur correction lens 210*d* should be transmitted with high frequency. If, on the other hand, the expected level of subject dynamism is low, as in the landscape mode, it is more desirable to transmit the drive quantities of the blur correction lens 210*d* with lower frequency. When the third information 95 included in the body operation information 91 indicates a photographing mode, such as the sports mode or the landscape mode, in correspondence to which the level of subject dynamism can be estimated, the lens CPU 203 will adjust the transmission frequency for the drive quantities of the blur correction lens 210*d* in correspondence to the expected level of subject dynamism.

When the remaining battery power available in the camera body 100 has become low, transmission of the various types of drive condition information will hasten the depletion of the battery power. Accordingly, if the fourth information 96 included in the body operation information 91 indicates remaining battery power equivalent to a predetermined ratio or less (e.g., 20% or less), the lens CPU 203 will uniformly lower the transmission frequencies for the various types of drive condition information. For instance, it may lower the transmission frequency for each type of drive condition information by ½.

It is to be noted that while it is desirable to lower the transmission frequency for the FL data 51 as well as the remaining battery power becomes low, the transmission frequency for the FL data 51 may be reduced via the camera body 100 by decreasing the frequency with which it issues the hotline communication start request.

As has been described above in reference to the specific examples, the lens CPU 203 alters the frequencies with which the IR data 52 and the VR data 53 are transmitted based upon the body operation information 91.

(Description of the Drive Condition Information Transmission Frequencies) In response to the hotline communication start request issued from the camera body 100, the lens CPU 203 executes the drive condition information detection processing. The hotline communication start request is provided in the form of a shift in the signal level at a specific signal line, as explained earlier. The body CPU 103 subsequently executes the drive condition information transmission processing as described earlier. In the drive condition information transmission processing, the various types of drive condition information having been detected through the drive condition information detection processing are transmitted by the lens CPU 203 to the body CPU 103.

The timing with which the drive condition information is transmitted in the current embodiment is explained in reference to FIG. 6, in reference to which the first embodiment has been described. FIG. 6 presents an example of timing with which the drive condition information may be transmitted. The following description is given by assuming that the body CPU 103 has indicated in the specification data 30 that all types of drive condition information are to be transmitted. In addition, while the frequency data 40 shown in FIG. 4 are used in the first embodiment, "every second time" and "every third time" respectively are selected as the transmission frequency for the drive quantity of the iris diaphragm 211 and the transmission frequency for the drive quantities of the blur correction lens 210*d* by the lens CPU 203 in the current embodiment without using such frequency data.

As explained earlier, the body CPU 103 executes the hotline communication with a predetermined cycle 60. In principle, the FL data 51, i.e. the drive quantity of the focus lens 210*c*, are transmitted each time the hotline communication is conducted. Accordingly, sets of transmission data 61 to 66 transmitted from the lens CPU 203 through the hotline communication executed at time points t1 to t6 invariably include the FL data 51. While the IR data 52, for which a transmission frequency of "every second time" is specified, are included in the transmission data 61, 63 and 65 transmitted at the time points t1, t3 and t5, the IR data 52 are not included in the other sets of transmission data 62, 64 and 66. Likewise, the VR data 53, for which a transmission frequency of "every third time" has been specified, are included in the transmission data 61 and 64 transmitted at the time points t1 and t4 alone.

As described above, the lens CPU 203 selectively transmits the specific types of drive condition information indicated in the specification data 30, through the first transmission path 301 to the camera body 100 repeatedly. In addition, the lens CPU 203 transmits the FL data 51 pertaining to the drive condition of the focus lens 210*c* to the camera body 100 each time the hotline communication is conducted. The IR data 52 pertaining to the drive condition of the iris diaphragm 211 and the VR data 53 pertaining to the drive condition of the blur correction lens 210*d*, on the other hand, are each transmitted with a frequency (e.g., every third time) lower than the transmission frequency of the FL data 51. Furthermore, the lens CPU 203 adjusts the transmission frequencies for the IR data 52 and the VR data 53 based upon the body operation information 91 having been received and transmits the IR data 52 and the VR data 53 by attaching them to the FL data 51.

The following advantages are achieved with the camera system in the fifth embodiment described above.

(1) The photographic optical system 210 includes the focus lens 210*c*, the iris diaphragm 211 and the blur correction lens 210*d*, the drive conditions of which change. The lens CPU 203 transmits the FL data 51 pertaining to the drive condition of the focus lens 210*c* to the camera body 100 with a predetermined transmission frequency. In addition, the lens CPU 203 transmits the IR data 52 pertaining to the drive condition of the iris diaphragm 211 with a transmission frequency lower than the transmission frequency of the FL data 51 and also transmits the VR data 53 pertaining to the drive condition of the blur correction lens 210*d* with a transmission frequency lower than the transmission frequency of the FL data 51. The lens CPU 203 receives the body operation information 91 indicating the operating state of the camera body 100, transmitted from the camera body 100. The lens CPU 203 alters the transmission frequency for the IR data 52 and the transmission frequency for the VR data 53 based upon the received body operation information 91 and transmits the IR data 52 and the VR data 53 by attaching them to the FL data 51. Through these measures, the calculation load placed on the lens CPU for the drive condition information communication can be reduced.

(2) The lens CPU 203 transmits the FL data 51, the IR data 52 and the VR data 53 via the first transmission path 301 to the camera body 100 and receives the body operation information 91 from the camera body 100 via the second transmission path 302, which is different from the first transmission path 301. Thus, the transmission of the various types of drive condition information and the reception of the body operation information 91 can be executed concurrently. Furthermore, the transmission of the various types of drive condition information and the reception of the body operation information 91 do not interfere with each other.

(3) The body operation information 91 includes the first information 93 indicating whether or not the camera body 100 is locked to a tripod and the photographic optical system 210 includes the blur correction lens 210*d* used to correct blurring of the subject image. If the first information 93 having been received indicates that the camera body 100 is locked to a tripod, the lens CPU 203 adjusts the transmission frequency for the VR data 53 so as to lower the transmission frequency for the VR data 53 compared to the frequency with which the VR data are transmitted when the camera body 100 is not locked to a tripod. As a result, an increase in the volume of communication data attributable to inclusion of unnecessary VR data 53 is prevented.

(Sixth Embodiment) While the camera system achieved in the sixth embodiment includes components similar to those in the fifth embodiment, transmission data adopting a format different from that of the fifth embodiment are transmitted/received in the sixth embodiment. The format of the transmission data transmitted by the lens CPU 203 in the camera system achieved in the sixth embodiment, which is similar to the transmission data format in the second embodiment, is described below in reference to FIGS. 7A and 7B.

FIGS. 7A and 7B present examples of transmission data that may be transmitted in the sixth embodiment. In the embodiment, transmission data with a fixed length are invariably transmitted through the hotline communication, as in the second embodiment. Namely, the transmission data always assume a four-byte length, with the FL data, the IR data and the VR data (two bytes) stored in this order with the FL data constituting the lowest-order byte data. In addition, type data indicating the types of drive condition information included in the transmission data are not attached to the transmission data.

When a specific type of drive condition information is not included in the transmission data, e.g., when the specification data indicate that the particular type of drive condition information is not to be transmitted, the various types of drive condition information excluding the specified drive condition information are linked together in a predetermined order in the third embodiment, as shown in FIG. 10E. In the current embodiment, the specific type of drive condition information is replaced with invalid-value information with all the bits thereof indicating "0". Namely, the value of "0" is designated in correspondence to each type of drive condition information as an exception value indicating that the corresponding type of drive condition information is invalid.

For instance, the lens CPU 203 transmits transmission data 74 that include all the drive condition information as shown in FIG. 7A, in order to provide all types of drive condition information (the FL data 71, the IR data 72 and the VR data 73). However, if the FL data 71 are not to be transmitted, the lens CPU 203 transmits transmission data 75 that indicate dummy data 76 with all the bits thereof indicating "0" in place of the FL data 71, as shown in FIG. 7B. In this case, the body CPU 103 handles the invalid-value data 76 as "data indicating that the corresponding drive condition information has been excluded by the lens CPU 203".

The following advantage is achieved with the camera system in the sixth embodiment described above.

(1) The transmission data 74 are always provided as fixed-length data. Such fixed-length transmission data can be handled with better ease by the body CPU 103, compared to variable-length transmission data. For instance, the reception buffer will only need to handle fixed-length data, and each type of drive condition information saved at a fixed address and will be more easily accessed.

(Seventh Embodiment) In the various embodiments described so far, the lens CPU 203 executing the drive condition information detection processing detects all types of drive condition information to be transmitted. However, under certain operating conditions at the lens CPU 203, e.g., when the lens CPU 203 is engaged in execution of other higher priority processing, it may take a while to complete the drive condition information detection. However, it is desirable that the drive condition information detection processing be completed quickly with a sufficient time margin relative to the hotline communication cycle (e.g., every millisecond).

Accordingly, a time limit is set for the drive condition information detection processing in the current embodiment. If the drive condition information detection processing does not end within the predetermined time limit, the lens CPU 203 replaces the drive condition information with invalid-value data indicating that the drive condition information detection has not been completed.

The transmission data in the embodiment are similar to the transmission data in FIG. 7 transmitted in the sixth embodiment. Namely, the transmission data always assume a four-byte length, with the FL data, the IR data and the VR data (two bytes) stored in this order with the FL data constituting the lowest-order byte data. In the sixth embodiment, the value of "0" is defined as an invalid value for all the bits in correspondence to each type of drive condition information. In the current embodiment, data with all the bits indicating a value of "1" (e.g., a value of "255" in the case of one-byte data) are also handled as invalid-value data. For instance, the FL data may be defined as data that may take values in a 1 to 254 range, and whenever the FL data indicate "0" or "255", the body CPU 103 may handle the data as invalid FL data.

Furthermore, different meanings are attached to these two invalid values in the embodiment. As in the sixth embodiment, the invalid-value data with all the bits indicating "0" are defined as "data indicating that the lens CPU 203 has excluded the particular type of drive condition information". The invalid-value data with all the bits indicating "1", on the other hand, are defined as "data indicating that the lens CPU 203 has not been able to detect the corresponding type of drive condition information within the predetermined time limit". The body CPU 103 having received transmission data checks the individual types of drive condition information and if there is any data with all the bits indicating the invalid value of "1", the body CPU decides that the corresponding type of drive condition information has not been detected in time.

It is to be noted that failure to complete drive condition information detection may be indicated in a manner different from that described above. For instance, if all of the transmission data are provided as variable-length data, as has been described in reference to the fifth embodiment, unavailability of drive condition information may be indicated with the type data which indicate the types of drive condition information included in the transmission data. In other words, type data taking on a specific value may indicate that the lens CPU 203 has excluded a given type of drive condition information or that the lens CPU 203 has not been able to detect drive condition information before the predetermined time limit was reached.

The following advantages are achieved with the camera system in the seventh embodiment described above.

(1) A predetermined time limit is set for the drive condition information detection processing, and the lens CPU 203 immediately ends the drive condition information detection processing upon reaching the time limit. As a result, it is ensured that each hotline communication session is always completed within the predetermined length of time, assuring better communication response.

(2) The lens CPU 203 uses two different types of invalid-value data either of which may be included in drive condition information to carry a specific meaning. As a result, whenever invalid-value data are transmitted from the lens CPU 203, the body CPU 103 is able to determine whether the drive condition information detection has not been completed in time or transmission of the particular drive condition information has been purposefully skipped.

The following variations are also within the scope of the present invention and a single variation or a plurality of variations may be adopted in combination with any of the embodiments having been described.

(Variation 1)

In any of the embodiments described above, if the drive condition information that can be transmitted from the interchangeable lens 200 is not needed at the camera body 100, transmission of the specification data 30 from the camera body 100 may be suspended. In addition, the body CPU 103 may be structured so as to decide through decision-making processing that even drive condition information that the camera body 100 does not use is needed.

(Variation 2) There may be two or more types of drive condition information provided in correspondence to a single optical member (drive target member). For instance, while the VR data 53 indicating the drive quantities of the blur correction lens 210*d* in the various embodiments described above are constituted with a lateral drive quantity VRX and a longitudinal drive quantity VRY, these drive quantities may be handled as separate sets of drive condition information independent of each other. In addition, there may be two or more sets of drive condition information, which belong to completely different categories or are used in totally different ways, in correspondence to a single optical member. For instance, in each of the embodiments described above, data indicating the speed with which the focus lens 210*c* is driven may be made available in addition to the FL data 51 indicating the drive quantity of the focus lens 210*c*.

(Variation 3) The initialization processing may be executed with any timing. For instance, even while the camera body 100 remains in a power off state, the initialization processing may be executed as soon as an interchangeable lens 200 is mounted. As an alternative, the initialization processing may be executed only if the interchangeable lens 200 is already mounted when the power to the camera body 100 is turned on. In addition, the specification data 30, the frequency data 40 and the cycle data 80 may be transmitted with timing other than the timing of the initialization processing. For instance, the body CPU 103 may be configured so as to adjust the transmission frequency of a specific type of drive condition information or the update cycle of a specific type of drive condition information in correspondence to the photographing mode selected at the camera.

(Variation 4) A representation format other than that described in reference to the embodiments may be adopted as the drive condition information representation format. For instance, the drive quantity of each optical member (each drive target member) may be indicated as an integral value representing the absolute position of the particular optical member or it may be indicated with integral-value data or floating decimal point data, the size of which is at least two bytes. An alternative representation format may likewise be adopted for the characteristics data 10, the type data 20, the specification data 30, the frequency data 40 and the cycle data 80.

(Variation 5) Utilization modes other than the drive condition information utilization mode described in reference to the embodiments may be adopted. For instance, the drive quantity of the focus lens 210*c* may be utilized by a device other than the autofocus adjustment device.

(Variation 6) If the lens CPU 203 in the second embodiment has not been able to detect the various types of drive condition information due to performance-related restrictions, dummy data generated through an alternative method without setting all the bits to "0" may be used. Namely, a method similar to that described in reference to the seventh embodiment or yet another method may be adopted so as to clearly indicate whether the transmission of drive condition information has been purposefully skipped, as instructed by the body CPU 103 or the transmission of the particular drive condition information has had to be skipped due to failure to complete the drive condition information detection processing within the predetermined time limit. The body CPU 103, having received such dummy data, may reduce the drive condition information transmission frequency so as to avert further failure to complete the drive condition information detection processing in time.

As long as the features characterizing the present invention are not compromised, the present invention is not limited to the particulars of the embodiments described above and other modes that are conceivable within the technical scope of the present invention are also within the scope of invention.

The above described embodiments are examples and various modifications can be made without departing from the scope of the invention.

What is claimed is:

1. An interchangeable lens that is detachably mounted at a camera body, comprising:
   a photographic optical system that includes a first drive target member and a second drive target member, the first target member changing a first drive condition and the second target member changing a second drive condition;
   a drive condition information transmission unit that transmits to the camera body first drive condition information relating to the first drive condition and second drive condition information relating to the second drive condition;
   a transmission frequency information reception unit that receives from the camera body transmission frequency information indicating a transmission frequency,
   wherein:
   the drive condition information transmission unit transmits the first drive condition information at a first transmission frequency and transmits the second drive condition information at the transmission frequency indicated in the transmission frequency information as a second transmission frequency, the second transmission frequency being lower than the first transmission frequency, by attaching the second drive condition information to the first drive condition information,
   the drive condition information transmission unit transmits the first drive condition information and the second drive condition information to the camera body through a first transmission path at a first cycle, and
   the transmission frequency information reception unit receives the transmission frequency information from the camera body through a second transmission path at a second cycle the first transmission path being different from the second transmission path and the first cycle being different than the second cycle.

2. An interchangeable lens according to claim 1, wherein the first transmission frequency corresponds to each time a hotline communication is conducted, a request for the hotline communication being started by the camera body switching a signal level at a specific signal line.

3. An interchangeable lens according to claim 1, wherein the first cycle is shorter than the second cycle.

4. An interchangeable lens that is detachably mounted at a camera body, comprising:
- a photographic optical system that includes a first drive target member and a second drive target member, the first target member changing a first drive condition and the second target member changing a second drive condition;
- a drive condition information transmission unit that transmits to the camera body first drive condition information relating to the first drive condition and second drive condition information relating to the second drive condition; and
- an operation information reception unit that receives, from the camera body, body operation information to an operating state of the camera body, wherein:
- the drive condition information transmission unit transmits the first drive condition information at a first transmission frequency and transmits the second drive condition information at a second transmission frequency lower than the first transmission frequency by attaching the second drive condition information to the first drive condition information, the second transmission frequency being altered in correspondence to the body operation information having been received,
- the drive condition information transmission unit transmits the first drive condition information and the second drive condition information to the camera body through a first transmission path at a first cycle, and
- the operation information reception unit receives the body operation information through a second transmission path at a second cycle, the first transmission path being different from the second transmission path and the first cycle being different than the second cycle.

5. An interchangeable lens according to claim 4, wherein:
- the first drive target member and the second drive target member are driven independently of each other; and
- the first drive condition information and the second drive condition information change independently of each other.

6. An interchangeable lens according to claim 4, wherein:
- the body operation information is constituted with at least one of information indicating whether or not the camera body is locked to a tripod, information indicating a photographing mode set at the camera body and information indicating remaining battery power available from a battery in the camera body.

7. An interchangeable lens according to claim 6, wherein:
- the body operation information indicates whether or not the camera body is locked to the tripod;
- the second drive target member is a blur correction lens used to correct image blur manifested in the photographic optical system; and
- the drive condition information transmission unit adjusts the second transmission frequency so as to lower the second transmission frequency set when the body operation information indicates that the camera body is locked to the tripod relative to the second transmission frequency set when the body operation information indicates that the camera body is not locked to the tripod.

8. An interchangeable lens according to claim 4, wherein:
- the first drive target member and the second drive target member are each a focus lens used to adjust a focusing condition of the photographic optical system, a blur correction lens used to correct image blur manifested by the photographic optical system or an aperture via which an amount of light to be transmitted through the photographic optical system is adjusted.

9. An interchangeable lens according to claim 4, wherein:
the first transmission frequency corresponds to each time a hotline communication is conducted, a request for the hotline communication being started by the camera body switching a signal level at a specific signal line.

10. An interchangeable lens according to claim 4, wherein the first cycle is shorter than the second cycle.

11. An interchangeable lens that is detachably mounted at a camera body, comprising:
- a photographic optical system that includes a first drive target member and a second drive target member, the first target member changing a first drive condition and the second target member changing a second drive condition;
- a storage unit that stores first drive condition information relating to the first drive condition and second drive condition information relating to the second drive condition;
- a first drive condition information update unit that updates the first drive condition information stored in the storage unit with a first update cycle;
- an update cycle information reception unit that receives from the camera body update cycle information indicating a second update cycle longer than the first update cycle;
- a second drive condition information update unit that updates the second drive condition information stored in the storage unit with the second update cycle indicated in the update cycle information; and
- a drive condition information transmission unit that transmits to the camera body the first drive condition information and the second drive condition information stored in the storage unit, wherein:
- the drive condition information transmission unit transmits the first drive condition information and the second drive condition information to the camera body through a first transmission path at a first cycle, and
- the update cycle information reception unit receives the update cycle information from the camera body through a second transmission path at a second cycle, the first transmission path being different from the second transmission path and the first cycle being different than the second cycle.

12. An interchangeable lens according to claim 11, further comprising:
- a shortest update cycle information transmission unit that transmits to the camera body shortest update cycle information indicating a shortest update cycle with which the second drive condition information update unit is able to update the second drive condition information.

13. An interchangeable lens according to claim 11, wherein the first cycle is shorter than the second cycle.

14. A camera body at which an interchangeable lens, equipped with a photographic optical system that includes a first drive target member and a second drive target member, the first target member changing a first drive condition and the second target member changing a second drive condition; is detachably mounted, comprising:
- a drive condition information reception unit that receives from the interchangeable lens first drive condition information relating to the first drive condition at a first transmission frequency and second drive condition information relating to the second drive condition at a second transmission frequency; and
- a transmission frequency information transmission unit that transmits to the interchangeable lens transmission frequency information indicating a transmission frequency equal to or lower than the first transmission frequency, wherein:
the drive condition information reception unit receives the second drive condition information with the transmission frequency indicated in the frequency information designated as the second transmission frequency, wherein:
the drive condition information reception unit receives the first drive condition information and the second drive condition information from the interchangeable lens through a first transmission path at a first cycle, and
the transmission frequency information transmission unit transmits the transmission frequency information to the interchangeable lens through a second transmission path at a second cycle, the first transmission path being different from the second transmission path and the first cycle being different than the second cycle.

15. A camera body with an interchangeable lens according to claim 14, wherein the first cycle is shorter than the second cycle.

16. A camera system, comprising:
a camera body; and
an interchangeable lens that can be detachably mounted at the camera body, wherein:
the interchangeable lens includes:
a photographic optical system that includes a first drive target member and a second drive target member, the first target member changing a first drive condition and the second target member changing a second drive condition;
a storage unit that stores first drive condition information relating to the first drive condition and second drive condition information relating to the second drive condition;
a first drive condition information update unit that updates the first drive condition information stored in the storage unit with a first update cycle;
a second drive condition information update unit that updates the second drive condition information stored in the storage unit with a second update cycle that is longer than the first update cycle;
a shortest update cycle information transmission unit that transmits to the camera body shortest update cycle information indicating a shortest update cycle with which the second drive condition information update unit is able to update the second drive condition information;
an update cycle information reception unit that receives from the camera body update cycle information indicating an update cycle longer than the first update cycle; and
a drive condition information transmission unit that transmits to the camera body the first drive condition information and the second drive condition information stored in the storage unit;
the camera body includes:
a shortest update cycle information reception unit that receives the shortest update cycle information;
an update cycle information transmission unit that transmits to the interchangeable lens the update cycle information indicating an update cycle that is not shorter than the update cycle indicated in the shortest update cycle information having been received at the shortest update cycle information reception unit; and
a drive condition information reception unit that receives from the interchangeable lens the first drive condition information and the second drive condition information, wherein:
the second drive condition information update unit updates the second drive condition information by designating the update cycle indicated in the update cycle information having been received at the update cycle information reception unit as the second update cycle,
the drive condition information reception unit receives the first drive condition information and the second drive condition information from the interchangeable lens through a first transmission path at a first cycle, and
the update cycle information transmission unit transmits the transmission frequency information to the interchangeable lens through a second transmission path at a second cycle, the first transmission path being different from the second transmission path and the first cycle being different than the second cycle.

* * * * *